United States Patent [19]

Isono et al.

[11] Patent Number: 5,688,341

[45] Date of Patent: Nov. 18, 1997

[54] HYDROGEN-ABSORBING ALLOY ELECTRODE AND METHOD FOR EVALUATING HYDROGEN-ABSORBING ALLOYS FOR ELECTRODE

[75] Inventors: Takahiro Isono; Hiroshi Watanabe; Shin Fujitani; Hiroshi Nakamura; Yumiko Nakamura; Ikuo Yonezu, all of Osaka, Japan

[73] Assignee: Sanyo Electric Co. Ltd, Osaka, Japan

[21] Appl. No.: 676,574

[22] Filed: Jul. 1, 1996

Related U.S. Application Data

[63] Continuation of Ser. No. 318,110, Oct. 5, 1994, abandoned.

[30] Foreign Application Priority Data

Oct. 8, 1993 [JP] Japan .................................. 5-277709
Oct. 13, 1993 [JP] Japan .................................. 5-280623

[51] Int. Cl.$^6$ .............................. C21D 11/00; C21D 1/54
[52] U.S. Cl. ..................... 148/505; 148/508; 148/421
[58] Field of Search ............................ 378/70, 71, 75; 429/223; 148/500, 508, 505, 421; 420/900

[56] References Cited

U.S. PATENT DOCUMENTS 5,272,746 12/1993 Isobe et al. ............................... 378/71
5,281,390 1/1994 Gamo et al. ............................ 420/900
5,284,619 2/1994 Hazama ................................... 420/900

FOREIGN PATENT DOCUMENTS 0417802 3/1991 European Pat. Off. .
61-133581 6/1986 Japan .
63-264867 11/1988 Japan .
463207 2/1992 Japan .

OTHER PUBLICATIONS

Toraya et al., Mineralogical Journal, 10, pp. 211–221 Jan. 1981.
Buckstegge, HTM Harterei—Technische Mitteilungen 47, pp. 54–62 Dec. 1992.
Patent Abstracts of Japan, vol. 017, No. 678 Dec. 1993.
Patent Abstracts of Japan, vol. 014, No. 539 Dec. 1990.
Patent Abstracts of Japan, vol. 017, No. 554 Dec. 1993.

Primary Examiner—Scott Kastler

[57] ABSTRACT

A hydrogen-absorbing alloy electrode utilizes as an electrode material a hydrogen-absorbing alloy having selectively oriented crystals, which is expressed in terms of a specific maximum value obtained from analysis of powder X-ray diffractometry. This electrode, in which the hydrogen-absorbing alloy used is hardly pulverized upon repeated charge-discharge cycles and oxidation thereof is suppressed, gives metal hydride alkaline secondary batteries having excellent cycle characteristics. A method for evaluating hydogen-absorbing alloys for electrode comprises, utilizing the fact that there exists a clear relationship between specific parameters obtained by analyzing data based on the hydrogen-absorbing alloy to be evaluated and the characteristics of the electrode obtained therefrom, preparing and using analytical curves with the specific parameters. This method can evaluate rapidly and precisely various characteristics of hydrogen-absorbing alloys for electrode, without actually fabricating test cells therefrom.

10 Claims, 16 Drawing Sheets

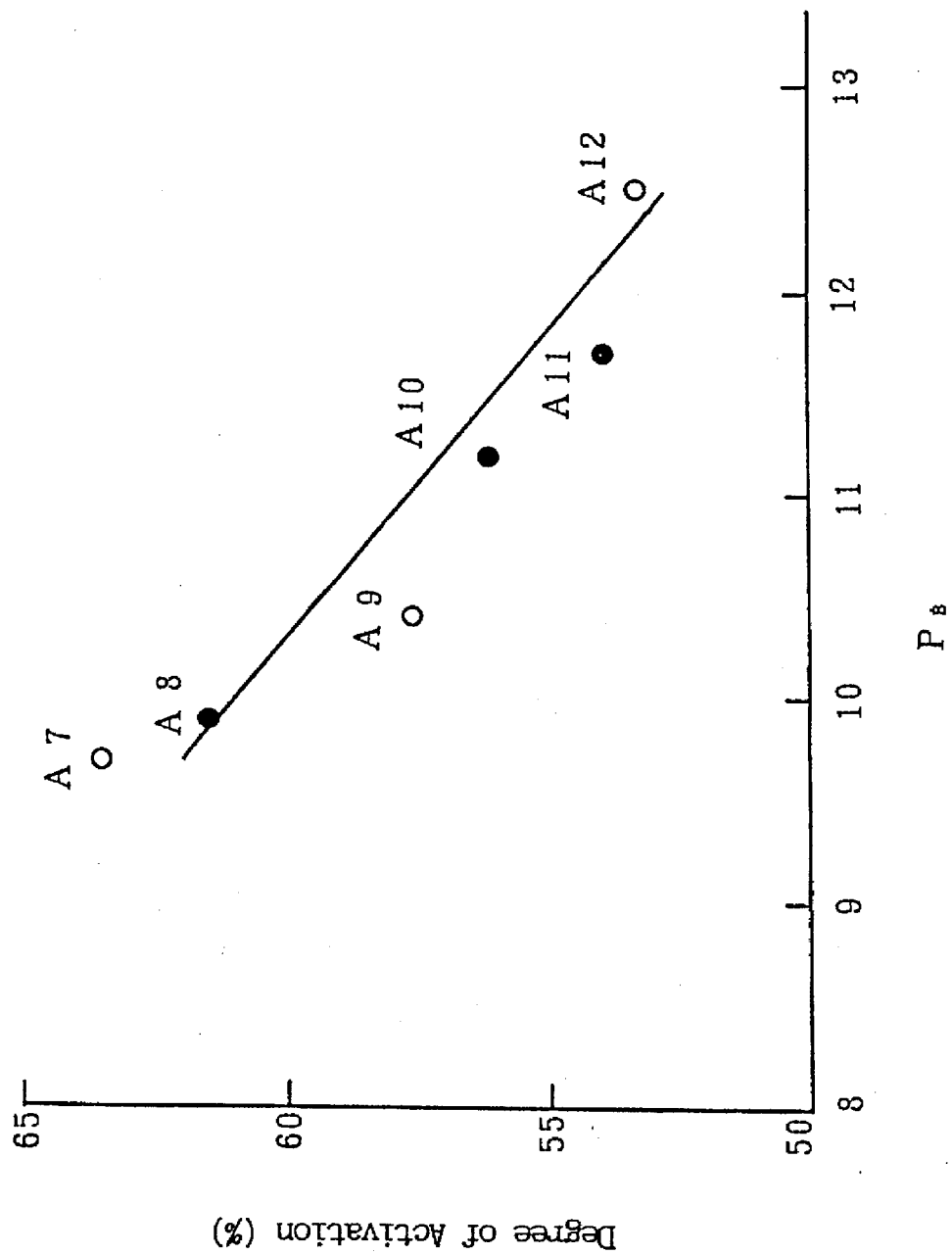

HYDROGEN-ABSORBING ALLOY ELECTRODE AND METHOD FOR EVALUATING HYDROGEN-ABSORBING ALLOYS FOR ELECTRODE

This application is a continuation of application Ser. No. 08/318,110 filed on Oct. 5, 1994, now abandoned.

BACKGROUND OF THE INVENTION

1. Field of the Invention

The present invention relates to a hydrogen-absorbing alloy electrode used as a negative electrode for metal hydride alkaline secondary batteries and also to a method for evaluating hydrogen-absorbing alloys for electrode.

2. Description of the Prior Art

Hydrogen-absorbing alloys capable of absorbing and discharging hydrogen have been developed actively in recent years. Metal hydride alkaline secondary batteries utilizing these hydrogen-absorbing alloys as negative electrode materials have been attracting much attention and expected to become a mainstream in the next generation, since they are lighter and can be provided with higher capacity as compared to lead, nickel-cadmium and like conventional secondary batteries.

Hydrogen-absorbing alloys used for batteries must absorb or discharge hydrogen at near room temperature. Representative examples of these alloys currently in actual use are $CaCu_5$-type alloys having a basic structure of $LaNi_5$ or $MmNi_5$. In addition, various studies have been made to commercialize $AB_2$-type alloys having a C14 Laves structure, which are expected to become of high capacity.

However, metal hydride alkaline secondary batteries utilizing the above conventional hydrogen-absorbing alloy have the problem of insufficient cycle characteristics, because of the following reasons (1) through (3).

(1) The elements of the alloy are oxidized (corroded) on the surface of the alloy, to form there an inert film.

(2) The elements of the alloy dissolve into the electrolyte used and hence the alloy composition changes.

(3) Upon charge or discharge and upon absorption or desorption of hydrogen, swelling or shrinking stress occurs in the crystal lattices of the alloy. Then, upon repetition of charge and discharge cycles, the hydrogen-absorbing alloy is gradually pulverized to create newly formed surfaces. The elements of the alloy exposed on the newly formed surfaces are either oxidized, thereby producing inert films, or dissolved in the electrolyte, thereby changing the alloy composition.

In order to eliminate the above problems (1) and (2), various proposals have been made to optimize the alloy composition. However, mere optimization of alloy composition cannot eliminate the above problem (3) of pulverization of hydrogen-absorbing alloys which deteriorates the cycle characteristics.

An attempt of plating hydrogen-absorbing alloys has been made in recent years to suppress deterioration of cycle characteristics due to their pulverization. This plating method, however, has not sufficiently improved the cycle characteristics.

As a result of an intensive study to suppress pulverization of hydrogen-absorbing alloys which is a principal cause for deterioration of the cycle characteristics, the present inventors have found that there is a close relationship between the pulverization of a hydrogen-absorbing alloy and the orientation (preferred orientation) of the crystals of the alloy.

Accordingly, an object of the present invention is to provide a hydrogen-absorbing alloy electrode with which the hydrogen-absorbing alloy used hardly pulverizes in the course of repeated charge-discharge cycles and can hence give metal hydride alkaline secondary batteries having excellent cycle characteristics.

Next, the important features of hydrogen-absorbing alloy electrodes are evaluated by determining the degree of activation in an initial stage of cycles, corrosion resistance, initial electrode capacity, charge-discharge cycle characteristics (retention of capacity) and like properties. These evaluations have been made on sample batteries actually prepared with the electrode to be tested.

However, since the properties of a hydrogen-absorbing alloy fluctuates with minute variations in its preparation conditions, such as roll surface speed in the liquid quenching process, gas ejection speed in the gas atomization process, cooling water temperature in the casting process and the like. Then, the properties of electrodes prepared therefrom also fluctuate to some extents. Such being the case, in conducting quality control of a production line, it becomes necessary to fabricate batteries for evaluation actually for each production lot and evaluate them for various properties, thereby checking the characteristics of the electrodes. This type of evaluation requires a time-consuming process. There has therefore long been desired development of a method for estimating the characteristics of hydrogen-absorbing alloys as electrode materials rapidly and precisely, without actually fabricating test batteries.

In order to realize the above desire, the present inventors have made an intensive study on the properties of various hydrogen-absorbing alloys for electrode. As a result, it has been found that although there exists no distinct relationship between the composition or lattice constant of a hydrogen-absorbing alloy and the characteristics of the electrode obtained therefrom, there does exists clear relationship between specific parameters obtained by analyzing data based on the results of X-ray diffractometry conducted on the hydrogen-absorbing alloy to be evaluated and the characteristics of the electrode obtained therefrom.

Accordingly, another object of the present invention is to provide a method for evaluating hydrogen-absorbing alloys for electrodes, which can evaluate the alloys rapidly and precisely.

SUMMARY OF THE INVENTION

The present invention provides a hydrogen-absorbing alloy electrode, utilizing as an electrode material a hydrogen-absorbing alloy having a maximum value among Q's as defined by the following formula (1) and obtained on each lattice plane (hkl) of at least 20%;

$$Q = \frac{[I_1(hkl)/I_2(h'k'l')]obs - [I_3(hkl)/I_4(h'k'l')]ran}{[I_3(hkl)/I_4(h'k'l')]ran} \times 100 \quad (1)$$

wherein $[I_1(hkl)/I_2(h'k'l')]obs$ is the ratio between the integrated intensity $I_1(hkl)$ of a powder X-ray diffraction peak of said hydrogen-absorbing alloy in each lattice plane (hkl) and that $I_2(h'k'l')$ in a lattice plane (h'k'l') optionally selected as a standard plane, and $[I_3(hkl)/I_4(h'k'l')]ran$ is the ratio between the integral density $I_3(hkl)$ of a powder X-ray diffraction peak of a hydrogen-absorbing alloy having the same composition as the composition of the above hydrogen-absorbing alloy but having no regularity in the direction of crystal growth in each lattice plane (hkl) and that $I_4(h'k'l')$ in the above lattice plane (h'k'l').

The present invention further provides a method for evaluating hydrogen-absorbing alloys for electrode, which comprises the steps of:

(1) subjecting a plurality of hydrogen-absorbing alloys $M_1, M_2, \ldots, M_X$ for preparing analytical curve, each having a preferred orientation in lattice plane $(h_0k_0l_0)$ and having the same alloy composition as that of the hydrogen-absorbing alloy E to be evaluated, and a hydrogen-absorbing alloy S which is to be used as a standard and also has the same alloy composition, to X-ray diffractometry, to obtain integrated intensities of the diffraction peaks $I_{M1}(h_1k_1l_1), I_{M2}(h_2k_2l_2), \ldots, I_{MX}(h_Xk_Xl_X)$ and $I_S(h_1k_1l_1), I_S(h_2k_2l_2), \ldots, I_S(h_Xk_Xl_X)$ in optionally selected lattice planes $(h_1k_1l_1), (h_2k_2l_2), \ldots, (h_Xk_Xl_X)$, respectively, obtaining the integrated intensity ratios $I_{M1}(h_1k_1l_1)/I_S(h_1k_1l_1), I_{M2}(h_2k_2l_2)/I_S(h_2k_2l_2), \ldots, I_{MX}(h_Xk_Xl_X)/I_S(h_Xk_Xl_X)$ and the angles $\phi_1, \phi_2, \ldots, \phi_X$ formed by the above lattice planes $(h_1k_1l_1), (h_2k_2l_2), \ldots, (h_Xk_Xl_X)$ and the lattice plane $(h_0k_0l_0)$, respectively, and substituting the obtained intensity ratios and angles for $I(hkl)/I_S(hkl)$ and $\phi$ of the following formula (A), to obtain parameters $P_1, P_2, \ldots, P_X$, each of which corresponds to a parameter P in a function $F(\phi)$ satisfying the formula (A);

(2) preparing an analytical curve showing the relationship between the $P_1, P_2, \ldots, P_X$ obtained above and observed values, $T_1, T_2, \ldots, T_X$ representing a property of the hydrogen-absorbing alloy for preparing analytical curve;

(3) subjecting the hydrogen-absorbing alloy E to be evaluated to X-ray diffractometry, to obtain integrated intensities of the diffraction peaks $I_{E1}(h_{E1}k_{E1}l_{E1}), I_{E2}(h_{E2}k_{E2}l_{E2}), \ldots, I_{EY}(h_{EY}k_{EY}l_{EY})$ in optionally selected lattice planes $(h_{E1}k_{E1}l_{E1}), (h_{E2}k_{E2}l_{E2}), \ldots, (h_{EY}k_{EY}l_{EY})$, respectively, obtaining the integrated intensity ratios $I_{E1}(h_{E1}k_{E1}l_{E1})/I_S(h_{E1}k_{E1}l_{E1}), I_{E2}(h_{E2}k_{E2}l_{E2})/I_S(h_{E2}k_{E2}l_{E2}), \ldots, I_{EY}(h_{EY}k_{EY}l_{EY})/I_S(h_{EY}k_{EY}l_{EY})$ and the angles $\phi_{E1}, \phi_{E2}, \ldots, \phi_{EY}$ formed by the above lattice planes $(h_{E1}k_{E1}l_{E1}), (h_{E2}k_{E2}l_{E2}), \ldots, (h_{EY}k_{EY}l_{EY})$ and the lattice plane $(h_0k_0l_0)$, respectively, and substituting the obtained intensity ratios and angles for $I(hkl)/I_S(hkl)$ and $\phi$ of the following formula (A), to obtain a parameter $P_E$ for the hydrogen-absorbing alloy E to be evaluated; and (4) comparing the $P_E$ with the analytical curve to estimate the characteristics of the hydrogen-absorbing alloy E as an electrode material;

$$F(\phi)=I(hkl)/I_S(hkl) \qquad (A)$$

wherein $I(hkl)$ is the integrated intensity of the X-ray diffraction peak in lattice plane (hkl) of the above hydrogen-absorbing alloys $M_1, M_2, \ldots, M_X$ for preparing analytical curve or the hydrogen-absorbing alloy E to be evaluated; $I_S(hkl)$ is the integrated intensity of the X-ray diffraction peak in lattice plane (hkl) of the standard hydrogen-absorbing alloy S; $F(\phi)$ is a function of $\phi$ and contains a parameter P which varies according to the structure of the hydrogen-absorbing alloys $M_1, M_2, \ldots, M_X$ for preparing analytical curve or the hydrogen-absorbing alloy E to be evaluated; and $\phi$ is the angle (unit:radian) formed by the lattice plane $(h_0k_0l_0)$ and the lattice plane (hkl).

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 17 is a graph showing the relationship between the parameter $P_B$ and the degree of activation.

DETAILED DESCRIPTION OF THE PREFERRED EMBODIMENT

Examples of hydrogen-absorbing alloys usable in the present invention are those having a crystalline structure of $CaCu_5$ type ($AB_5$ type) hexagonal system, $MgNi_2$ type ($AB_2$ type) hexagonal system, $MgZn_2$ type ($AB_2$ type) hexagonal system and $MgCu_2$ type ($AB_2$ type) cubic system.

Examples of component A of hydrogen absorbing alloys having the above $AB_5$ type hexagonal system are at least one element selected from the group consisting of rare earth metals, e.g. La, Ce, Nd, Pr and Sm, and Ca, and those of component B are at least one transition element selected from the group consisting of Cr, Mn, Fe, Co, Ni, Cu, Sn and Al.

Examples of component A of hydrogen-absorbing alloys having the above $AB_2$ type hexagonal or cubic system are at least one element selected from the group consisting of Ti, Zr, Cr, V and alkali earth metals such as Ca and Mg, and those of component B are at least one transition element selected from the group consisting of Cr, Mn, Fe, Co, Ni, Cu, Sn and Al.

Figure 1:
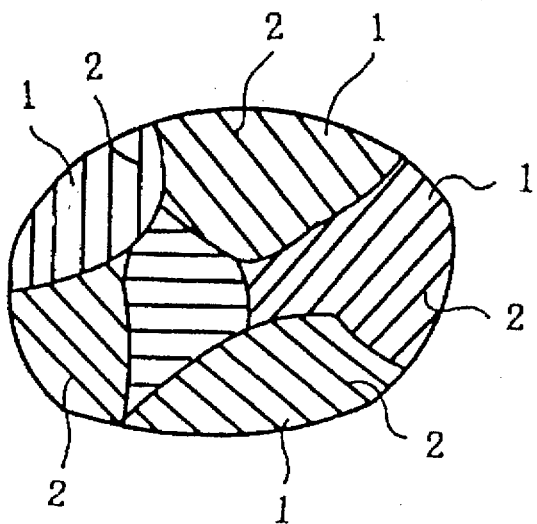
FIG. 1 is a schematic diagram illustrating an hydrogen-absorbing alloy in which crystals have grown in various directions (random orientation)
Figure 2:
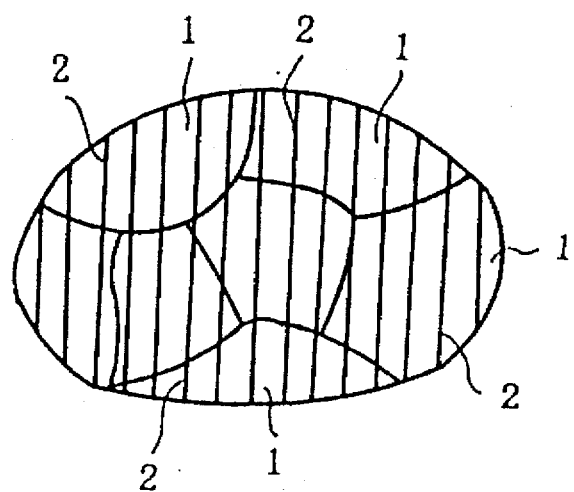
FIG. 2 is a schematic diagram illustrating another hydrogen-absorbing alloy, in which crystals have grown in a constant direction (preferred orientation) and which has the same composition as that of the hydrogen-absorbing alloy shown in FIG. 1.
Figure 3:
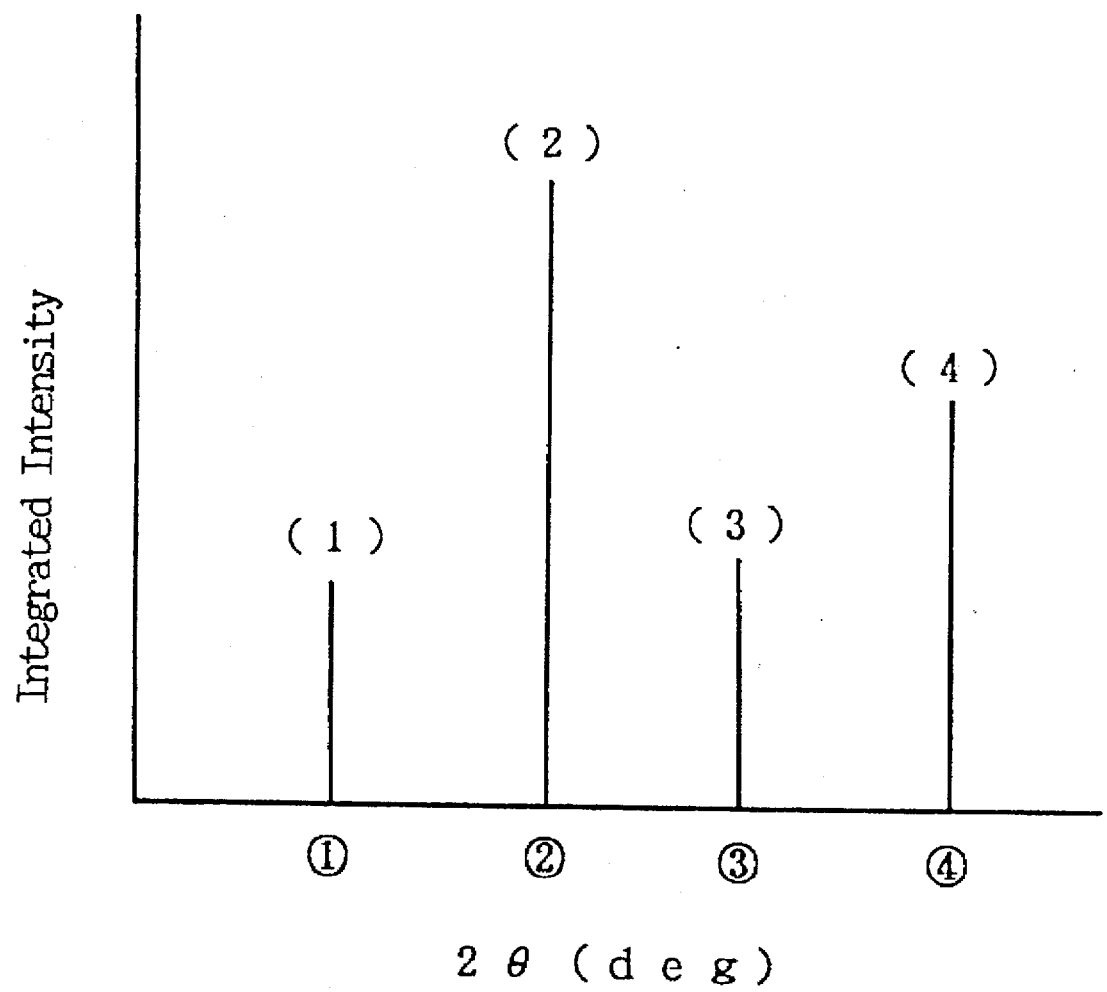
FIG. 3 is a graph showing the integrated intensity of the powder X-ray diffraction peak in each lattice plane of the hydrogen-absorbing alloy shown in FIG. 1.
Figure 4:
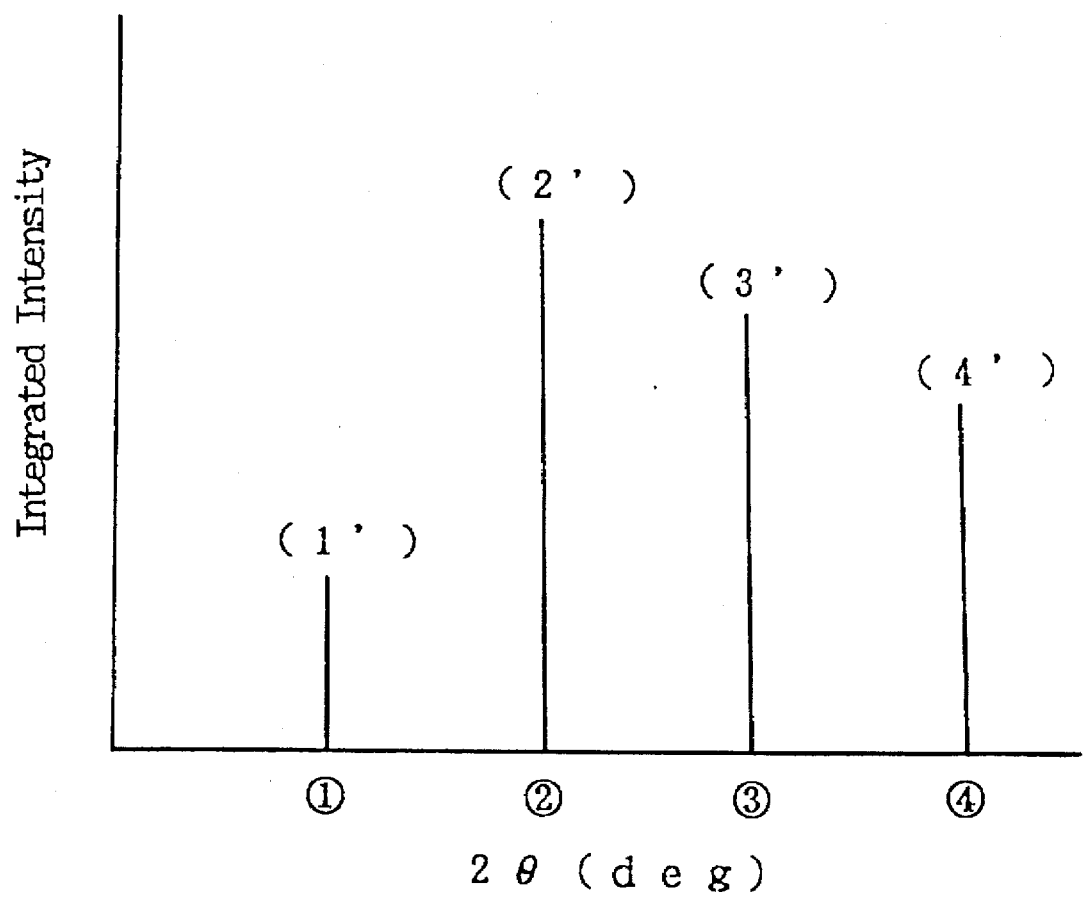
FIG. 4 is a graph showing the integrated intensity of the powder X-ray diffraction peak in each lattice plane of the hydrogen-absorbing alloy shown in FIG. 2.

The method for calculating the maximum value of Q (hereinafter referred to as Qmax) shown in the formula (1) is described by reference to FIGS. 1 through 4. FIG. 1 is a schematic diagram illustrating an hydrogen-absorbing alloy in which crystals have grown in various directions (random orientation) and FIG. 2 is a schematic diagram illustrating another hydrogen-absorbing alloy, in which crystals have grown in a constant direction (preferred orientation) and which has the same composition as that of the hydrogen-absorbing alloy shown in FIG. 1. In FIGS. 1 and 2, the numeral 1 represents a crystallite and 2 the direction of orientation. FIG. 3 is a graph showing the integrated intensity of the powder X-ray diffraction peak in each lattice plane of the hydrogen-absorbing alloy shown in FIG. 1, and FIG. 4 is a graph showing the integrated intensity of the powder X-ray diffraction peak in each lattice plane of the hydrogen-absorbing alloy shown in FIG. 2. In FIGS. 3 and 4, (1) and (1') show the integrated intensities of the powder X-ray diffraction peaks in lattice plane ①, and (2) and (2'), (3) and (3') and (4) and (4') show those in lattice planes ②, ③ and ④, respectively.

Comparison of FIG. 3 with FIG. 4 shows that the integrated intensity in lattice plane ③ (3') of the hydrogen-absorbing alloy shown in FIG. 2 is far larger than that (3) of the hydrogen-absorbing alloy shown in FIG. 1 having random orientation. It is understood from this fact that the hydrogen-absorbing alloy shown in FIG. 2 has a preferred orientation in lattice plane ③. By the way, in this case, the crystallites of the hydrogen-absorbing alloy shown in FIG. 2 are oriented in a direction perpendicular to the direction of crystal growth in lattice plane ③.

Let us take an example where lattice plane ② is selected as the standard plane. The quotient obtained by dividing the integrated intensity (3') in lattice plane ③ of the preferably oriented hydrogen-absorbing alloy by that (2') in lattice plane ② of the same hydrogen-absorbing alloy is $[I_1(hkl)/I_2(h'k'l')]$obs. The quotient obtained by diving the integrated intensity (3) in lattice plane ③ of the randomly oriented hydrogen-absorbing alloy by that (2) in lattice plane ② of the same hydrogen-absorbing alloy is $[I_3(hkl)/I_4(h'k'l')]$ran.

Substitution of the values of $[I_1(hkl)/I_2(h'k'l')]$obs and $[I_3(hkl)/I_4(h'k'l')]$ran thus obtained for those in the formula (1) gives a Q, which can be used as Qmax.

While this Example selects lattice plane ② as the standard plane, other lattices, i.e. lattice plane ① or lattice plane ④ may also be selected. However, for example, lattice plane (200) and lattice plane (110) in a hexagonal system are in a proportional relationship where the integrated intensity of one plane increases linearly with that of the other. In this case, either one of these lattice planes cannot be a standard plane for another.

Where, as described above, one of the planes can clearly be identified as having a preferred orientation (hereinafter this plane is referred to as "preferably oriented plane"), Qmax can directly be obtained. Otherwise, a plurality as required of the Q values defined by the formula (1) are obtained, from which the maximum is taken as Qmax.

In the present invention, the preferably oriented plane of a hydrogen-absorbing alloy differs depending on the type and the like of the hydrogen-absorbing alloy, and may be the (110) plane or any other plane.

Hydrogen-absorbing alloys usable for the hydrogen-absorbing alloy electrodes according to the present invention have a Qmax of at least 20%, preferably at least 30%. With a hydrogen-absorbing alloy having a Qmax of at least 20%, i.e. having a strong preferred orientation, the stresses of swelling and shrinking applied to the crystal lattices tend to apply in a constant direction, so that the stresses of swelling and shrinking rarely cross each other and pulverization of the hydrogen-absorbing alloy hardly occurs. On the other hand, with a hydrogen-absorbing alloy having a Qmax of less than 20%, i.e. having a weak preferred orientation, stresses in crystal lattices having grown in different directions collide each other, thereby causing cracks to generate. Conventional hydrogen-absorbing alloys having a Qmax of about 10% therefore tend to undergo pulverization.

The method according to the present invention for evaluating hydrogen-absorbing alloys for electrode is now explained in detail.

Although the lattice planes $(h_{E1}k_{E1}l_{E1})$, $(h_{E2}k_{E2}l_{E2})$, ..., $(h_{EY}k_{EY}l_{EY})$ may be different from those $(h_1k_1l_1)$, $(h_2k_2l_2)$, ..., $(h_Xk_Xl_X)$, it is desirable that the two plane groups be wholly or partly the same. Then, with the same lattice planes, the integrated intensities of X-ray diffraction peaks of a standard hydrogen-absorbing alloy S obtained in step (1) can be used, as they are, as those that constitute the standard in step (3).

The values of $P_1, P_2, \ldots, P_x$ in step (1) and the value $P_E$ in step (3) can be obtained for example as follows. The ratios of the integrated intensities of the X-ray diffraction peaks of hydrogen-absorbing alloys for preparing analytical curve or the hydrogen-absorbing alloy to be evaluated to those of a standard hydrogen-absorbing alloy are obtained for several $\phi$'s, and putting the $\phi$'s and the obtained integrated intensity ratios into the formula (A) $[F(\phi)=I(hkl)/I_s(hkl)]$, to obtain simultaneous equations. The least square method is applied to each of the equations, to obtain most probable values, which give the P's.

As described before, although there exists no distinct relationship between the composition or lattice constant of a hydrogen-absorbing alloy and the characteristics of the electrode obtained therefrom, there does exist a clear relationship between specific parameters obtained by analyzing data based on the results of X-ray diffractometry of the hydrogen-absorbing alloy to be evaluated and the characteristics of the electrode obtained therefrom. It becomes therefore possible to evaluate the characteristics of any hydrogen-absorbing alloy as follows. At first, X-ray diffractometry is carried out on a series of hydrogen-absorbing alloys and then the above parameters are obtained by mathematical calculation, such as by least square method, of the obtained data. An analytical curve showing the relationship between the above parameter and the battery characteristics is prepared. Then, simple comparison of the hydrogen-absorbing alloy to be evaluated with the analytical curve can rapidly evaluate the electrode characteristics, with no need of actually fabricating test batteries and conducting various tests thereon.

In particular, where, as the function $F(\phi)$ in the method of the present invention, the function with the parameter P being $P_A$ and $P_B$ as specified by the following formula (B) is used, it becomes possible to estimate the characteristics of electrodes, such as the degree of activation, capacity retention ratio after charge-discharge cycles, corrosive resistance and capacity, more precisely and in the same degrees as those obtainable in the actual running test of batteries fabricated with the electrodes.

$$F(\phi)=P_A+(1-P_A)\exp(-P_B \cdot \phi^2) \qquad (B)$$

wherein $P_A$ and $P_B$ are parameters in the present invention, which vary corresponding to the alloy compositions of the hydrogen-absorbing alloys for preparing analytical curve, $M_1, M_2, \ldots, M_X$ and the hydrogen-absorbing alloy E to be evaluated and determine their characteristics as electrode materials, thus corresponding to the parameter P in the present invention; and $\phi$ is the angle (unit:radian) formed by the lattice plane ($h_0 k_0 l_0$) and the lattice plane (hkl).

Examples of hydrogen-absorbing alloys which can suitably evaluated by the method of the present invention are the same as already mentioned as usable for the hydrogen-absorbing alloy electrodes of the present invention.

Other features of the invention will become more apparent in the course of the following detailed descriptions of exemplary embodiments which are give for illustration of the invention and are not intended to be limiting thereof.

EXAMPLES

Example 1

[Preparation of hydrogen-absorbing alloy]

There were mixed La (simple substance metal having a purity of 99.5%) and Ni (simple substance metal having a purity of 99.9%) in a molar ratio of 1.0:5.0. The mixture was melted in an arc melting furnace under an argon atmosphere and the melt was solidified by a single roll method at a cooling rate of roll surface speed of $1 \times 10^3$ cm/sec or $5 \times 10^3$ cm/sec, to give 2 types of rare earth element-based hydrogen-absorbing alloy blocks having a composition of $LaNi_{5.0}$.

The hydrogen-absorbing alloy blocks were pulverized and the powders were analyzed by powder X-ray diffractometry, to be both found to have a dominant phase of $CaCu_5$ type hexagonal system. Hereinafter, the crystal structures of the hydrogen-absorbing alloys were all identified by powder X-ray diffractometry.

The Qmax of each of the hydrogen-absorbing alloys was determined, to show 36% (for the one obtained at a roll surface speed of $1 \times 10^3$ cm/sec) or 82% (for another obtained at a roll surface speed of $5 \times 10^3$ cm/sec). Both hydrogen-absorbing alloys had preferred orientation in the lattice plane (hk0).

For comparison purposes, the above procedure was followed except that the roll surface speed was changed to $1 \times 10^2$ cm/sec or $5 \times 10^2$ cm/sec, to obtain rare earth element-based hydrogen-absorbing alloy blocks having a Qmax of 9% or 19%, respectively. Although the hydrogen-absorbing alloys had a dominant phase of $CaCu_5$ hexagonal system, they had no preferred orientation.

[Preparation of hydrogen-absorbing alloy electrode]

The hydrogen-absorbing alloy blocks obtained above were mechanically pulverized into powders having an average particle diameter of about 80 μm. Alloy pastes were then obtained by mixing 1 part by weight of each of the alloy powders, 1.2 part by weight of nickel powder as a conductive agent and 0.2 part by weight of polytetrafluoroethylene (PTFE) as a binder and rolling the mixtures. A prescribed amount of each of the alloy pastes was wrapped with a nickel mesh and pressed, to give disc-shaped electrodes having a diameter of 20 mm according to the present invention, E1 (Qmax=36%) and E2 (Qmax=82%), and comparison electrodes having the same shape CE1 (Qmax=9%) and CE2 (Qmax=19%).

[Fabrication of test cells]

Test cells were fabricated with each of the above hydrogen-absorbing alloy electrodes as a test electrode (negative electrode), a counter electrode of a cylindrical sintered nickel electrode having a sufficiently large electrochemical capacity compared to the test electrodes, and a reference electrode of a plate-shaped sintered nickel electrode, and an electrolyte of 30% by weight aqueous potassium hydroxide solution.

Figure 5:
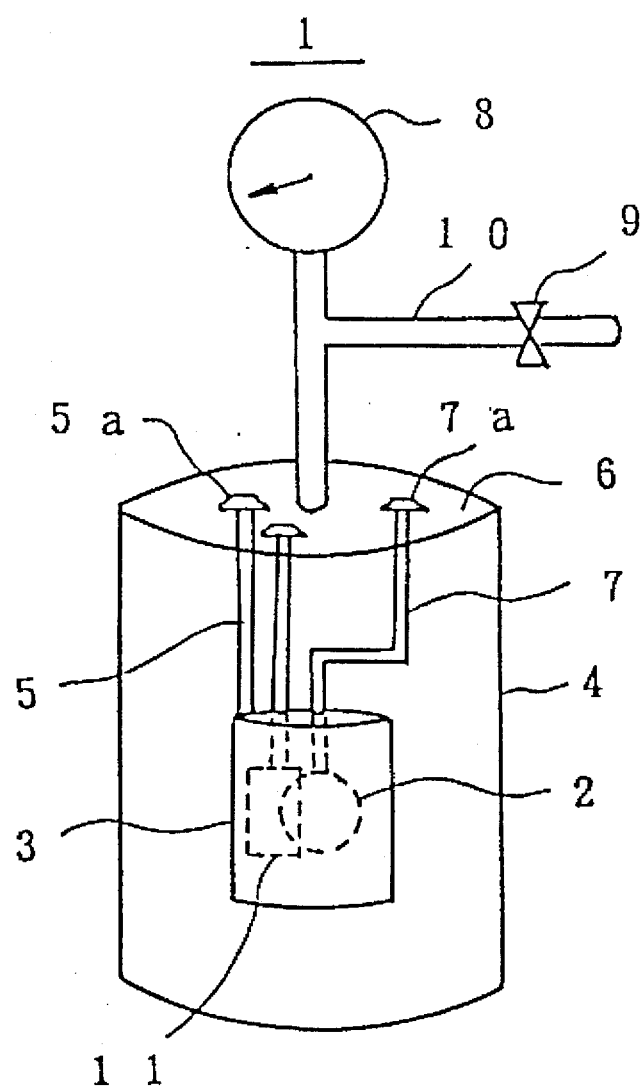
FIG. 5 is a schematic perspective view of one of the test cells fabricated in Examples.

FIG. 5 is a schematic perspective view of the test cell thus fabricated. In the FIGURE, the test cell 1 comprises a disc-shaped paste electrode (test electrode) 2, a cylindrical sintered nickel electrode (counter electrode) 3 having a sufficiently large electrochemical capacity compared to the test electrodes, a plate-shaped sintered nickel electrode (reference electrode) 11, an insulated closed container (of polypropylene) 4 and other parts.

The sintered nickel electrode 3 is held with a positive electrode lead 5 connected to the top surface 6 of the closed container 4. The paste electrode 2 is held vertically at near the center of the cylinder of the sintered nickel electrode 3, with a negative electrode lead 7 connected to the top surface 6 of the closed container 4.

The ends of the positive electrode lead 5 and negative electrode lead 7 are, penetrating the top surface 6 of the sealed container 4, exposed upwardly and connected there to a positive electrode terminal 5a and a negative electrode terminal 7a, respectively.

The paste electrode 2 and the sintered nickel electrode 3 are immersed in the alkaline electrolyte (30% by weight aqueous potassium hydroxide solution, not shown), the space above which is filled with nitrogen so that a prescribed pressure is applied to the paste electrode 2.

On the central part of the top surface 6 of the closed container 4, a pressure gauge 8 and a relief pipe 10 equipped with a relief valve 9 are mounted, in order to prevent the inside pressure of the closed container 4 from elevating above a prescribed level.

[Charge-discharge cycle test]

The test cells were subjected to repeated cycles of charging at a current of 30 mA/g for 8 hours, resting for 1 hour, then discharging to a discharge termination voltage of 1.0 V and then resting for 1 hour, at room temperature (25° C.). After 80 cycles, the cells were checked for the capacity retention ratio (%). The capacity retention ratio herein means the ratio of the capacity after repetition of charge-discharge cycles to the maximum capacity (100%). The results are shown in Table 1 and FIG. 6.

TABLE 1

| Electrode | Alloy composition | Crystal structure | Qmax (%) | Capacity retention ratio after 80 cycles (%) |
|---|---|---|---|---|
| E1 | LaNi₅ | CaCu₅ type hexagonal | 36 | 46 |
| E2 | " | CaCu₅ type hexagonal | 82 | 50 |
| CE1 | " | CaCu₅ type hexagonal | 9 | 41 |
| CE2 | " | CaCu₅ type hexagonal | 19 | 41 |

Figure 6:
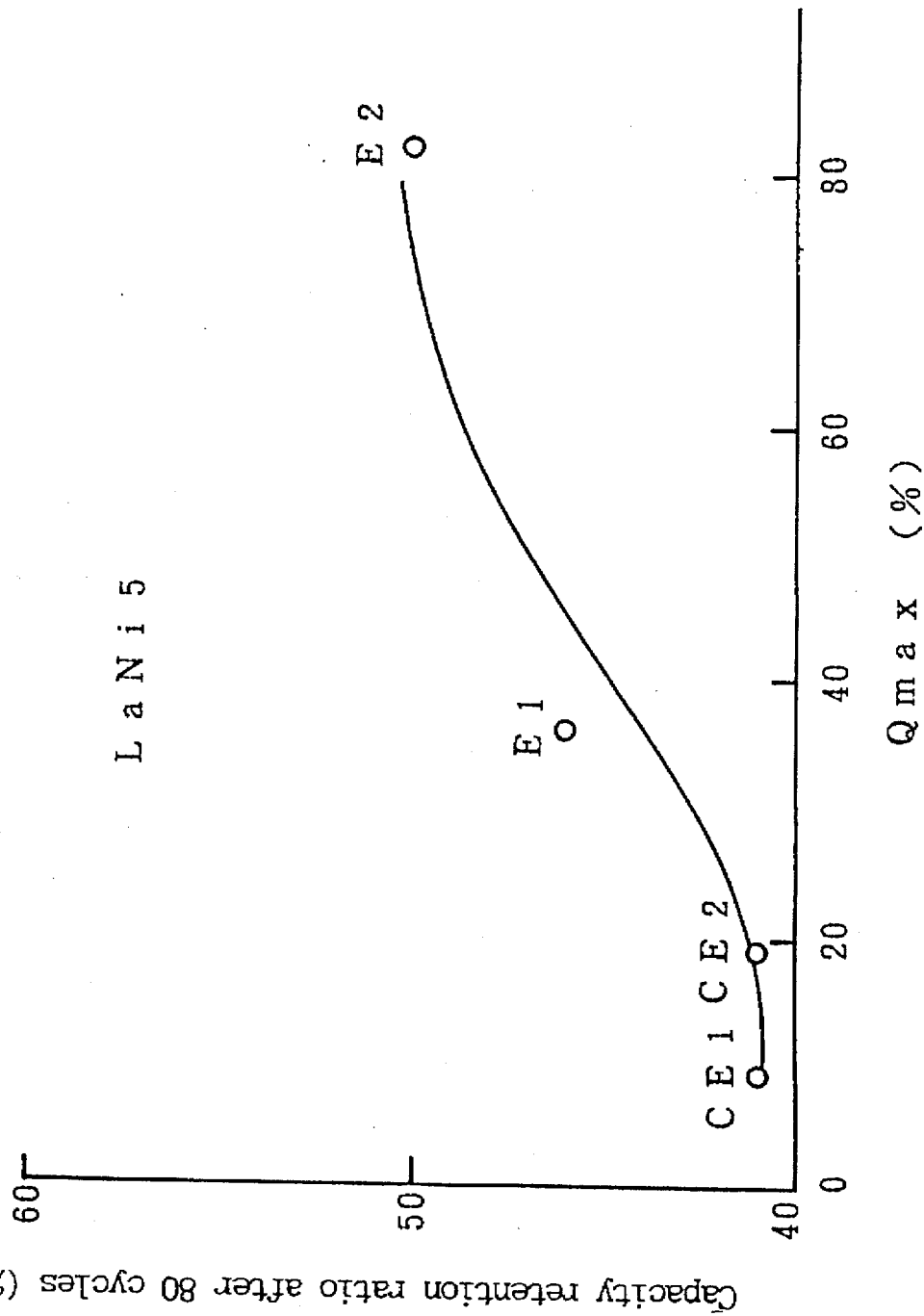
FIG. 6 is a graph showing the relationship between the Qmax and the capacity retention ratio at the 80-th cycle of a test cell utilizing an $LaNi_5$ alloy electrode.

As shown in Table 1 and FIG. 6, the test cells using the electrodes E1 and E2 according to the present invention have larger capacity retention ratio compared to those using the comparison electrodes CE1 and CE2 having a Qmax of less than 20%. This is considered to be due to that: while with CE1 and CE2 having a Qmax of less than 20%, pulverization of the hydrogen-absorbing alloy proceeded with increasing number of charge-discharge cycles because of weak preferred orientation, the electrodes of the present invention E1 and E2 having a Qmax of at least 30% and thus having a markedly intense preferred orientation were hardly pulverized even upon frequent repetition of the charge-discharge cycles.

Example 2

[Preparation of hydrogen-absorbing alloy electrode]

Example 1 was repeated except that there were used rare earth element-based hydrogen-absorbing alloys having a composition of $MmNi_{3.4}Co_{0.9}Mn_{0.5}Al_{0.2}$ and obtained by solidifying at a roll surface speed of $5\times10^2$ cm/sec, $8\times10^2$ cm/sec or $3\times10^3$ cm/sec, to prepare electrodes E3 (Qmax= 21%), E4 (Qmax=35%) and E5 (Qmax=67%) in this order, according to the present invention. These hydrogen-absorbing alloys all had a dominant phase of $CaCu_5$ type hexagonal system and, also had preferred orientation in the lattice plane (hk0).

For comparison purposes, the above procedure was followed except that the roll surface speed was changed to $1\times10^2$ cm/sec, to obtain a rare earth element-based hydrogen-absorbing alloy having a Qmax of 11% and a composition of $MmNi_{3.4}Co_{0.9}Mn_{0.5}Al_{0.2}$, which was then processed into a comparison electrode CE3. Although the hydrogen-absorbing alloy used here also had a dominant phase of $CaCu_5$ hexagonal system, it had no preferred orientation.

[Charge-discharge cycle test]

Test cells were fabricated with the electrodes E3 through E5 according to the present invention and comparison electrode CE3 in the same manner as in Example 1. The test cells were subjected to the same charge-discharge test under the same conditions as used in Example 1 and the capacity retention ratios (%) after 80 cycles were obtained. The results are shown in Table 2 and FIG. 7.

TABLE 2

| Electrode | Alloy composition | Crystal structure | Qmax (%) | C.R.R.*[1] after 80 cycles (%) |
|---|---|---|---|---|
| E3 | $MmNi_{3.4}Co_{0.9}Mn_{0.5}Al_{0.2}$ | $CaCu_5$ type hexagonal | 21 | 51 |
| E4 | " | $CaCu_5$ type hexagonal | 35 | 57 |
| E5 | " | $CaCu_5$ type hexagonal | 67 | 62 |
| CE3 | " | $CaCu_5$ type hexagonal | 11 | 50 |

*[1]C.R.R.: capacity retention ratio

Figure 7:
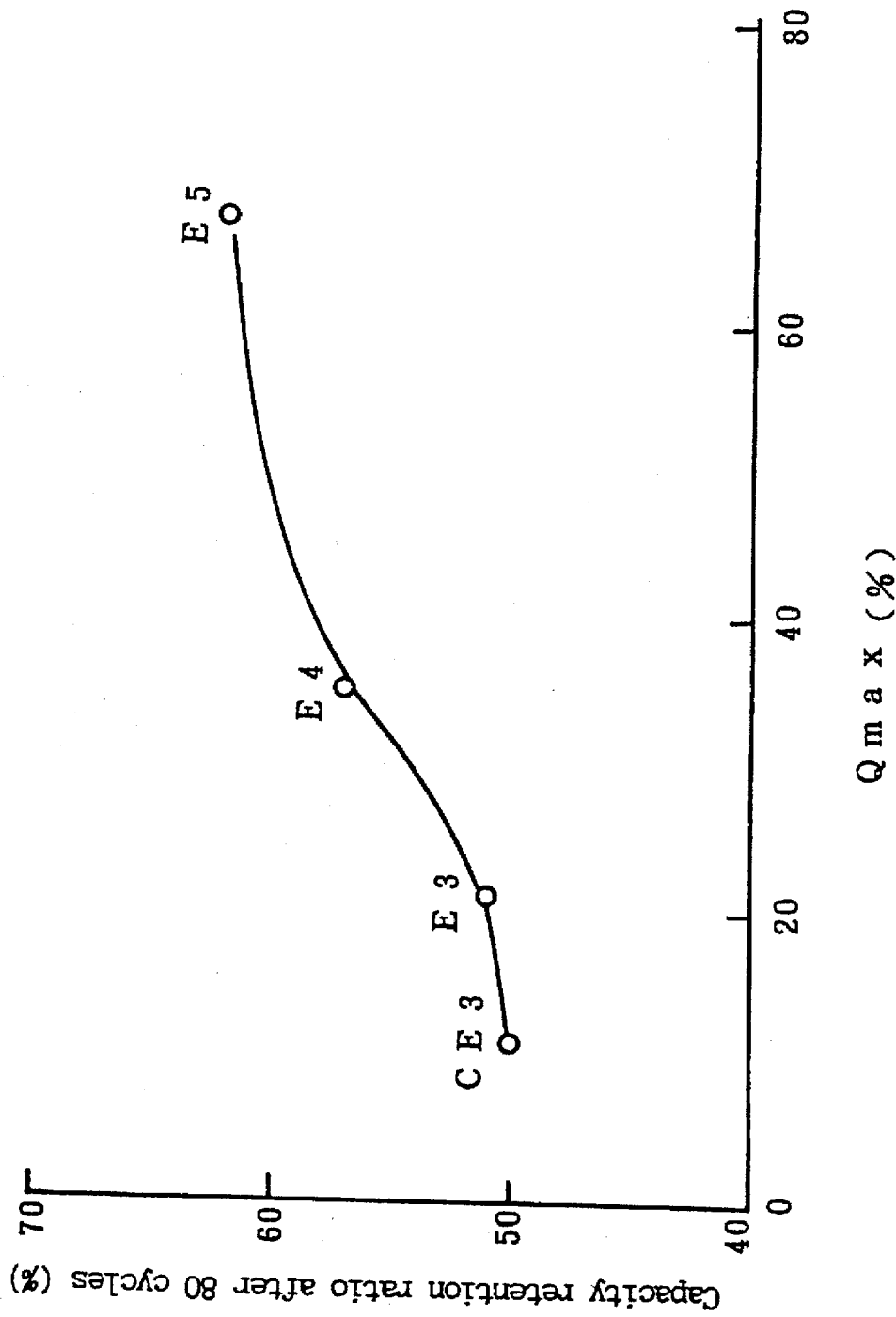
FIG. 7 is a graph showing the relationship between the Qmax and the capacity retention ratio at the 80-th cycle of a test cell utilizing an $MmLi_{3.4}Co_{0.9}Mn_{0.5}Al_{0.2}$ alloy electrode.

As shown in Table 2 and FIG. 7, the test cells using the electrodes E3 through E5 according to the present invention having a Qmax of at least 20% have a larger capacity retention ratio compared to that using the comparison electrode CE3 having a Qmax of less than 20%. Further the electrodes E4 and E5 according to the present invention, which have a large Qmax of at least 30%, have a markedly large capacity retention ratio at the 80-th cycle. These facts are attributable to the same mechanism as described in the item [Charge-discharge cycle test] in Example 1.

Example 3

[Preparation of hydrogen-absorbing alloy electrode]

Example 1 was repeated except that there were used hydrogen-absorbing alloys having a composition of $Ti_{0.5}Zr_{0.5}Ni_{1.25}V_{0.75}$ and obtained by solidifying at a roll surface speed of $5\times10^2$ cm/sec, $8\times10^2$ cm/sec, $3\times10^3$ cm/sec or $5\times10^3$ cm/sec, to prepare electrodes E6 (Qmax=20%), E7 (Qmax=28%), E8 (Qmax=52%) and E9 (Qmax=107%) in this order, according to the present invention. These hydrogen-absorbing alloys all had a dominant phase of $MgZn_2$ type hexagonal system and, also had preferred orientation in the lattice plane (hk0).

For comparison purposes, the above procedure was followed except that the roll surface speed was changed to $1\times10^2$ cm/sec, to obtain a hydrogen-absorbing alloy having a Qmax of 12% and a composition of $Ti_{0.5}Zr_{0.5}Ni_{1.25}V_{0.75}$, which was then processed into a comparison electrode CE4. Although the hydrogen-absorbing alloy used here also had a dominant phase of $MgZn_2$ hexagonal system, it had no preferred orientation.

[Charge-discharge cycle test]

Test cells were fabricated with the electrodes E6 through E9 according to the present invention and comparison electrode CE4 in the same manner as in Example 1. The test cells were subjected to the same charge-discharge test under the same conditions as used in Example 1 and the capacity retention ratios (%) after 80 cycles were obtained. The results are shown in Table 3 and FIG. 8.

TABLE 3

| Electrode | Alloy composition | Crystal structure | Qmax (%) | C.R.R.*[1] after 80 cycles (%) |
|---|---|---|---|---|
| E6 | $Ti_{0.5}Zr_{0.5}Ni_{1.25}V_{0.75}$ | $MgZn_2$ type hexagonal | 20 | 48 |
| E7 | " | $MgZn_2$ type hexagonal | 28 | 49 |
| E8 | " | $MgZn_2$ type hexagonal | 52 | 66 |
| E9 | " | $MgZn_2$ type hexagonal | 107 | 89 |
| CE4 | " | $MgZn_2$ type hexagonal | 12 | 44 |

*[1]C.R.R.: capacity retention ratio

Figure 8:
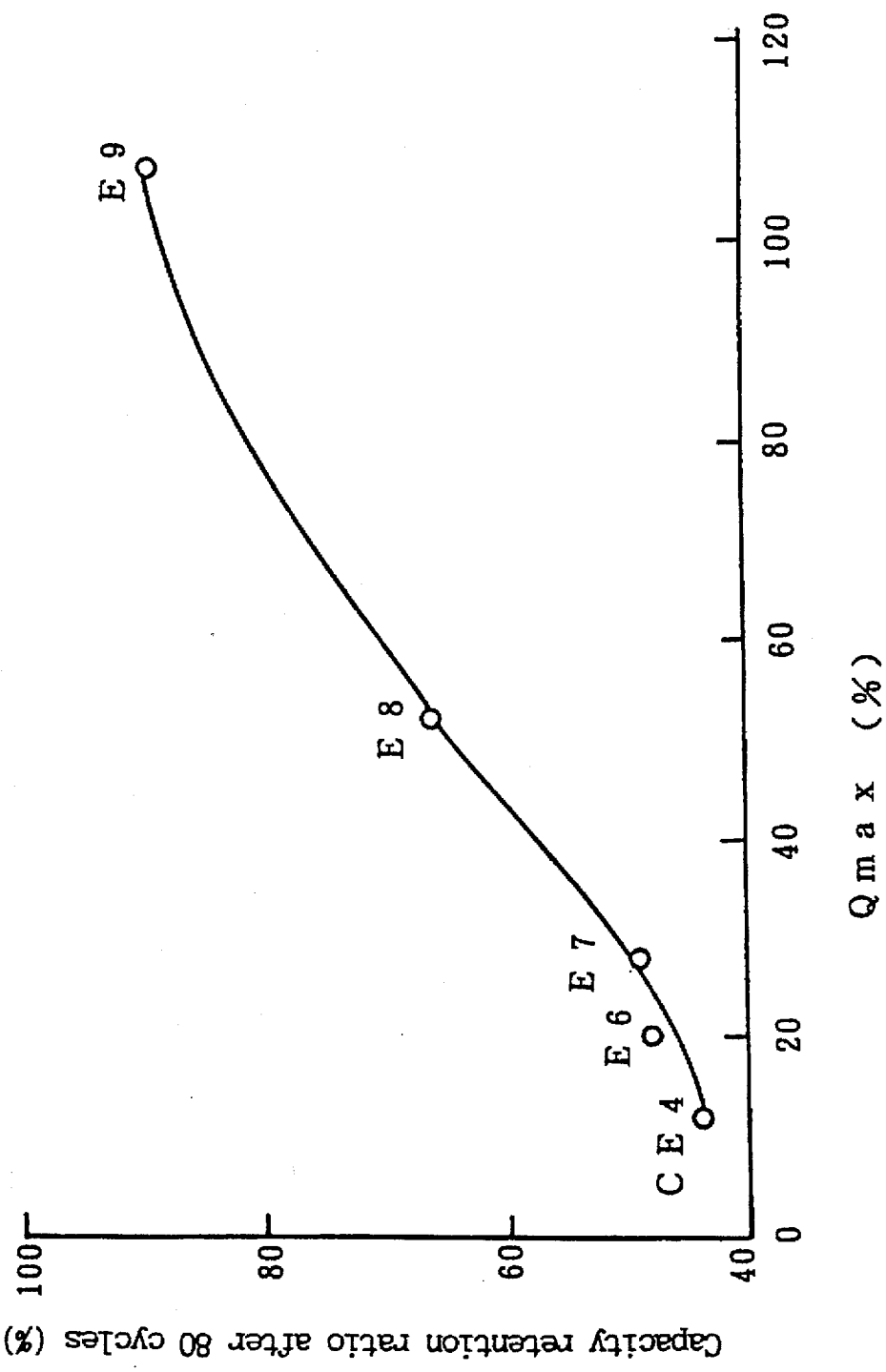
FIG. 8 is a graph showing the relationship between the Qmax and the capacity retention ratio at the 80-th cycle of a test cell utilizing a $Ti_{0.5}Zr_{0.5}Ni_{1.25}V_{0.75}$ alloy electrode.

As shown in Table 3 and FIG. 8, the test cells using the electrodes E6 through E9 according to the present invention having a Qmax of at least 20% have a larger capacity retention ratio at the 80-th cycle compared to that using the comparison electrode CE4 having a Qmax of less than 20%. In particular, the electrodes E8 and E9 according to the present invention, which have a large Qmax of at least 30%, have a markedly large capacity retention ratio at the 80-th cycle. These facts are also attributable to the same mechanism as described in the item [Charge-discharge cycle test] in Example 1.

Example 4

[Preparation of hydrogen-absorbing alloy electrode]

Example 1 was repeated except that there were used hydrogen-absorbing alloy having a composition of $ZrNi_{1.2}V_{0.6}Co_{0.2}$ and obtained by solidifying at a roll surface speed of $5\times10^2$ cm/sec, $1\times10^3$ cm/sec and $5\times10^3$ cm/sec, to prepare electrodes E10 (Qmax=23%), E11 (Qmax=34%) and E12 (Qmax=55%) in this order, according to the present invention. These hydrogen-absorbing alloys all had a dominant phase of $MgCu_2$ type cubic system and, also had preferred orientation in the lattice plane (hk0).

For comparison purposes, the above procedure was followed except that the roll surface speed was changed to $1\times10^2$ cm/sec, to obtain a hydrogen-absorbing alloy having a Qmax of 14% and a composition of $ZrNi_{1.2}V_{0.6}Co_{0.2}$, which was then processed into a comparison electrode CE5. Although the hydrogen-absorbing alloy used here also had a dominant phase of $MgCu_2$ cubic system, it had no preferred orientation.

[Charge-discharge cycle test]

Test cells were fabricated with the electrodes E10 through E12 according to the present invention and comparison electrode CE5 in the same manner as in Example 1. The test cells were subjected to the same charge-discharge test under the same conditions as used in Example 1 and the capacity retention ratios (%) after 40 cycles were obtained. The results are shown in Table 4 and FIG. 9.

TABLE 4

| Electrode | Alloy composition | Crystal structure | Qmax (%) | C.R.R.*[1] after 80 cycles (%) |
|---|---|---|---|---|
| E10 | $ZrNi_{1.2}V_{0.6}Co_{0.2}$ | $MgCu_2$ type cubic | 23 | 7 |
| E11 | " | $MgCu_2$ type cubic | 34 | 14 |
| E12 | " | $MgCu_2$ type cubic | 55 | 21 |
| CE5 | " | $MgCu_2$ type cubic | 14 | 6 |

*[1]C.R.R.: capacity retention ratio

Figure 9:
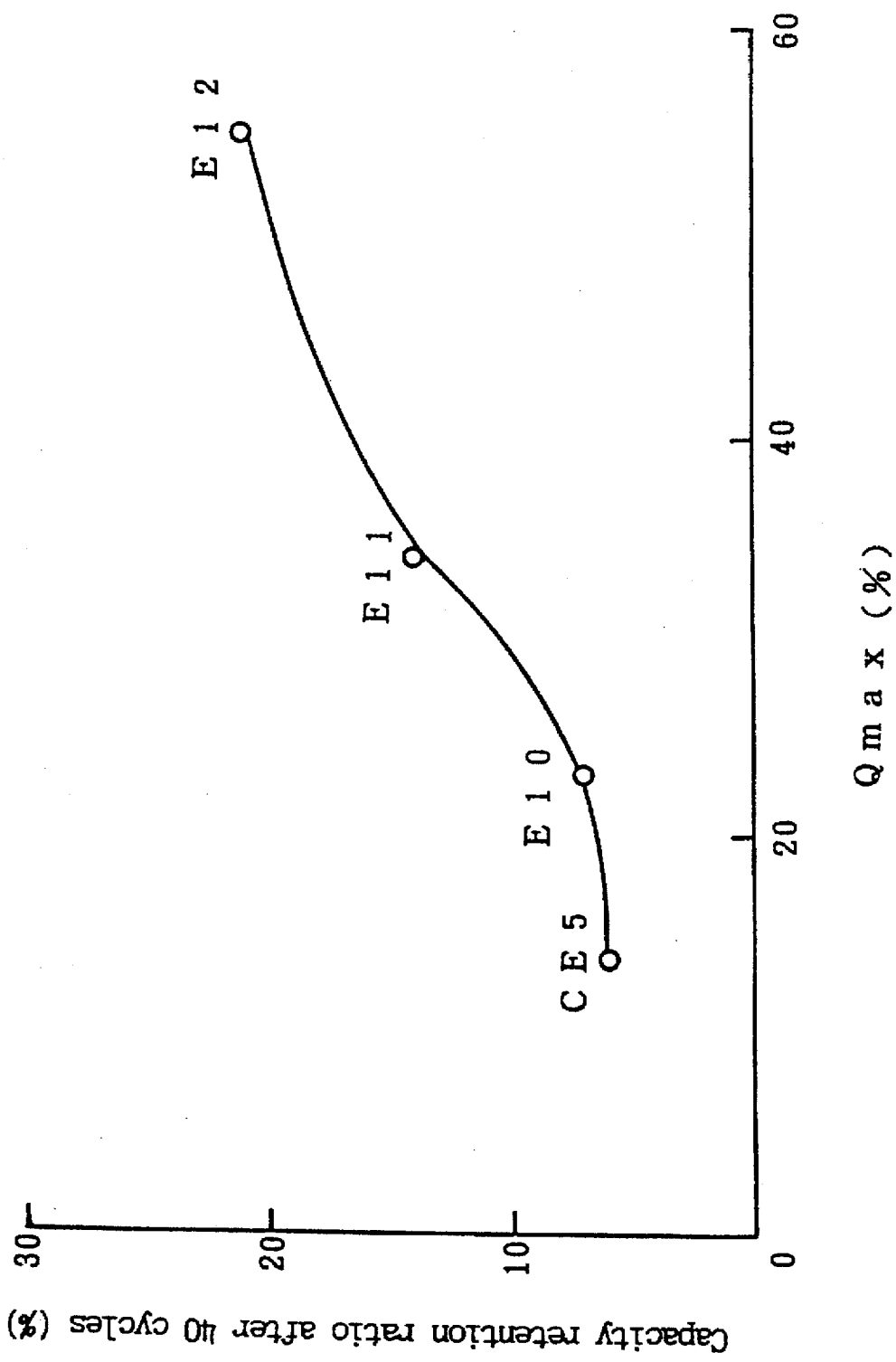
FIG. 9 is a graph showing the relationship between the Qmax and the capacity retention ratio at the 40-th cycle of a test cell utilizing a $ZrNi_{1.2}V_{0.6}Co_{0.2}$ alloy electrode.

As shown in Table 4 and FIG. 9, the test cells using the electrodes E10 through E12 according to the present invention having a Qmax of at least 20% have a larger capacity retention ratio (%) after 40 cycles compared to that using the comparison electrode CE5 having a Qmax of less than 20%. In particular, the electrodes E11 and E12 according to the present invention, which have a large Qmax of at least 30%, have a markedly large capacity retention ratio at the 40-th cycle. These facts are attributable to the same mechanism as described in the item [Charge-discharge cycle test] in Example 1.

It is clearly understood from the results of Examples 1 through 4 that any hydrogen-absorbing alloy having a Qmax of at least 20%, preferably at least 30%, i.e. having an intense preferred orientation in a specific lattice plane gives, regardless of its composition or crystal structure, a nickel hydride alkaline secondary battery having excellent cycle characteristics.

Although Examples 1 through 4 describes the electrodes according to the present invention as used for the negative electrodes of nickel hydride secondary batteries, the electrodes of the present invention are widely applicable to the electrodes of metal hydride alkaline secondary batteries in general.

Example 5

[Preparation of hydrogen-absorbing alloy]

There were mixed a commercially available Mm (Misch metal: mixture of rare earth elements), Ni, Co, Mn and Al in an elemental ratio of 1.0:3.1:0.9:0.6:0.4 and the mixture was melted in an arc melting furnace under an argon atmosphere. The alloy melt thus obtained by arc melting was solidified by dropping onto a roll rotating at a high roll surface speed (liquid quenching method) of $1\times10^3$ cm/sec, $2\times10^3$ cm/sec, $3\times10^3$ cm/sec, $4\times10^3$ cm/sec, $5\times10^3$ cm/sec or $6\times10^3$ cm/sec, to give hydrogen-absorbing alloys AL1 through AL6, in this order, having a composition of $MmNi_{3.1}Co_{0.9}Mn_{0.6}Al_{0.4}$. Separately, a standard alloy having the same composition and having no preferred orientation was prepared by allowing part of the above alloy melt to cool into an alloy block, pulverizing the alloy block into particles having an average diameter of 10 to 30 µm, then heat treating the particles at 800° C. under vacuum for 24 hours and allowing the treated particles to cool to room temperature.

[Calculation of parameters $P_A$ and $P_B$]

The hydrogen-absorbing alloys AL1 through AL6 and the standard hydrogen-absorbing alloy having no preferred orientation were analyzed by X-ray diffractometry. From the obtained patterns, integrated intensities in various lattice planes $(h_1k_1l_1)$, $(h_2k_2l_2)$, ..., $(h_xK_xl_x)$ were obtained and their ratios to that of the standard were calculated. These ratios were substituted for $I(hkl)/I_S(hkl)$ and the angles $\phi_1$, $\phi_2$, ..., $\phi_x$ formed by the preferred orientation plane (110) and the lattice planes $(h_1k_1l_1)$, $(h_2k_2l_2)$, ..., $(h_xK_xl_x)$ for $\phi$ in the above formula (B).

From the thus obtained simultaneous equations, parameters $P_A$'s and $P_B$'s which relate to the preferred orientation (alloy structure) of the hydrogen-absorbing alloys (see H. Toraya and F. Maruo, Mineralogical Journal, Vol. 10 (1981) 211) were obtained by the non-linear least square method. Although this Example used, as a standard hydrogen-absorbing alloy, one having no preferred orientation, which is not a must, those having a preferred orientation may also be used. The results are shown in Table 5.

TABLE 5

| Alloy | Roll surface speed (cm/sec) | $P_A$ | $P_B$ |
|---|---|---|---|
| AL1 | $1 \times 10^3$ | 0.75 | 12.5 |
| AL2 | $2 \times 10^3$ | 0.73 | 12.8 |
| AL3 | $3 \times 10^3$ | 0.70 | 13.2 |
| AL4 | $4 \times 10^3$ | 0.67 | 13.6 |
| AL5 | $5 \times 10^3$ | 0.63 | 14.1 |
| AL6 | $6 \times 10^3$ | 0.58 | 14.6 |

[Preparation of test cells]

The hydrogen-absorbing alloys AL1 through AL6 were mechanically pulverized into powders each having an average particle diameter of about 150 µm. Six alloy pastes were then prepared by mixing 1 g of each of the alloy powders, 1.2 g of nickel powder as a conductive agent and 0.2 g of polytetrafluoroethylene (PTFE) as a binder and rolling the mixtures. A prescribed amount of each of the alloy pastes was wrapped with a nickel mesh and pressed, to give disc-shaped hydrogen-absorbing alloy electrodes A1 through A6 having a diameter of 20 mm.

Test cells similar to those shown in FIG. 5 were fabricated with each of the above hydrogen-absorbing alloy electrodes as a test electrode (action electrode), a counter electrode of a cylindrical sintered nickel electrode having a sufficiently large electrochemical capacity compared to the test electrodes, and a reference electrode of a plate-shaped sintered nickel electrode, and an electrolyte of 30% by weight aqueous potassium hydroxide solution.

[Evaluation of capacity retention ratio]

The test cells were subjected to repeated cycles of charging at a current of 20 mA/g for 15 hours, resting for 1 hour, then discharging to a discharge termination voltage of 1.0 V and then resting for 1 hour, at room temperature (25° C.), to obtain capacity retention ratios (%) at the 100th cycle. The capacity retention ratio herein means the ratio of the capacity obtained above to the maximum capacity (100%).

Figure 10:
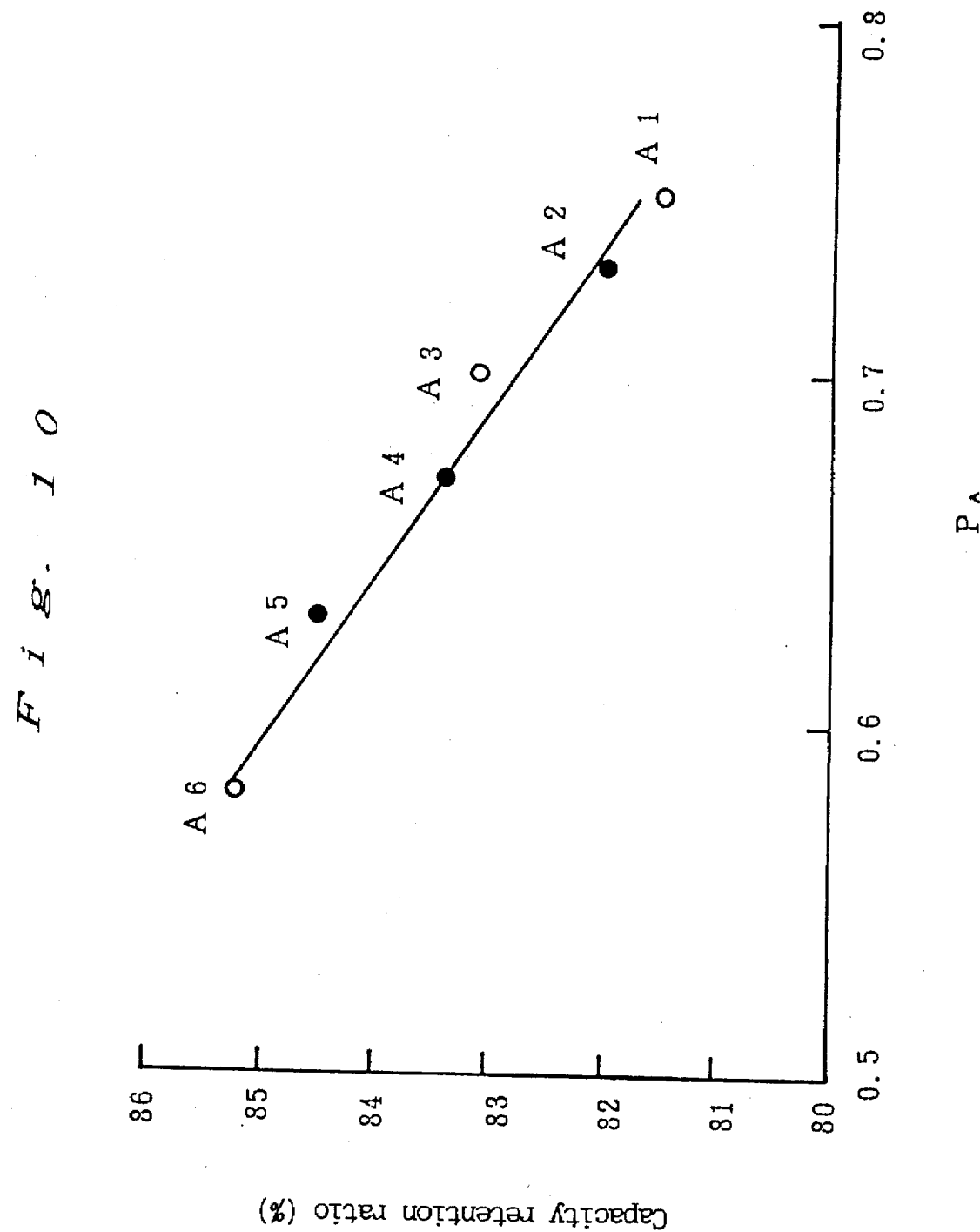
FIG. 10 is a graph showing the relationship between the parameter $P_A$ and the capacity retention ratio.
Figure 11:
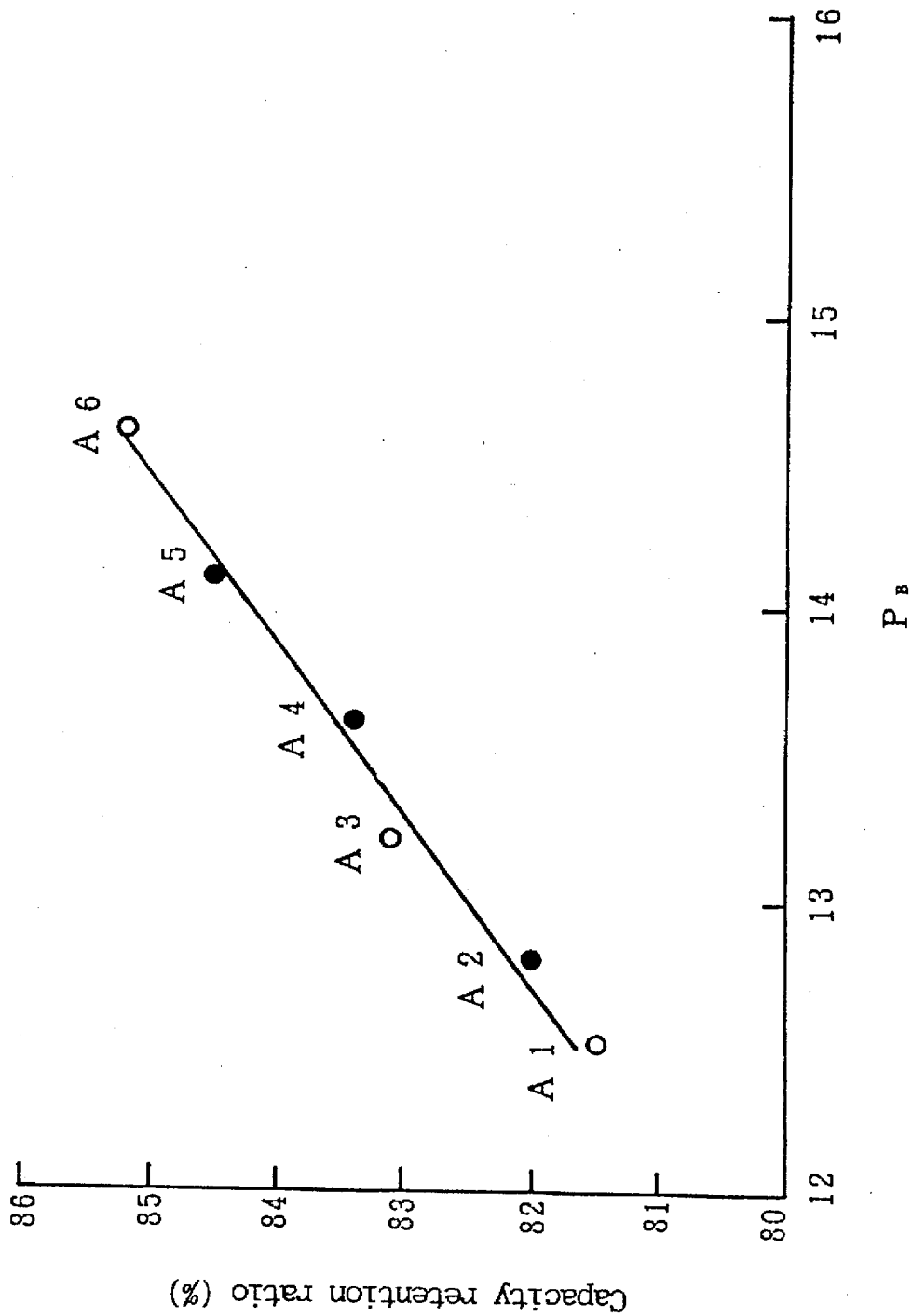
FIG. 11 is a graph showing the relationship between the parameter $P_B$ and the capacity retention ratio.

FIGS. 10 and 11 show the relationship between the capacity retention ratio of each the test electrodes thus obtained by actual measurement and the parameter $P_A$ and $P_B$, respectively, obtained on the hydrogen-absorbing alloys AL1 through AL6. FIG. 10 is a graph with the ordinate representing the capacity retention ratio and abscissa the parameter $P_A$, while FIG. 11 is a graph with the same ordinate and with the abscissa representing the parameter $P_B$.

FIGS. 10 and 11 clearly show that there exists a nearly primary functional (linear) relationship between the capacity retention ratio obtained by actual observation and the parameter $P_A$ or $P_B$ on each of the hydrogen-absorbing alloys.

The following method was used in order to estimate the capacity retention ratio of the test electrodes from the parameter $P_A$ or $P_B$.

Analytical curves (linear lines) showing the relationship between the capacity retention ratios obtained by actual observation on the test electrodes A1, A3 and A6, and the parameter $P_A$ or $P_B$ were obtained by the non-linear least square method. These analytical lines were drawn in solid lines in FIGS. 10 and 11.

Then, the capacity retention ratios of the test electrodes A2, A4 and A5 were estimated from the analytical lines thus drawn and compared with those obtained by actual observation. The estimation was conducted by locating, on the analytical lines, the points corresponding to the abscissa values of $P_A$'s or $P_B$'s of the hydrogen-absorbing alloys AL2, AL4 and AL5 and reading the ordinate values of the points. The results are shown in Table 6.

TABLE 6

| Test electrode | Capacity retention ratio (%) | | |
|---|---|---|---|
| | Observed | Estimated from $P_A$ | Estimated from $P_B$ |
| A1 | 81.5 | — | — |
| A2 | 82.5 | 82.2 | 82.2 |
| A3 | 83.1 | — | — |
| A4 | 83.4 | 83.5 | 83.4 |
| A5 | 84.5 | 84.4 | 84.2 |
| A6 | 85.2 | — | — |

Table 6 shows that the capacity retention ratios of each of the test electrodes A2, A4 and A5 estimated from the analytical lines are very-close to that obtained by actual observation. It is understood from this test that the use of parameter $P_A$ or $P_B$ realizes a very precise estimation of capacity retention ratio.

[Evaluation of degree of activation]

The test cells were charged at 20 mA/g for 15 hours, rested for 1 hour and then discharged at 100 mA/g to a discharge termination voltage of 1.0 V, to give a discharge capacity of $C_1$. The cells were then discharged at 20 mA/g to a discharge termination voltage of 1.0 V, to give a discharge capacity $C_2$. The degree of activation (%) of each cell was obtained from the discharge capacities $C_1$ and $C_2$ by the following formula.

$$\text{Degree of activation} = C_1/(C_1+C_2) \times 100 \quad (F)$$

Figure 12:
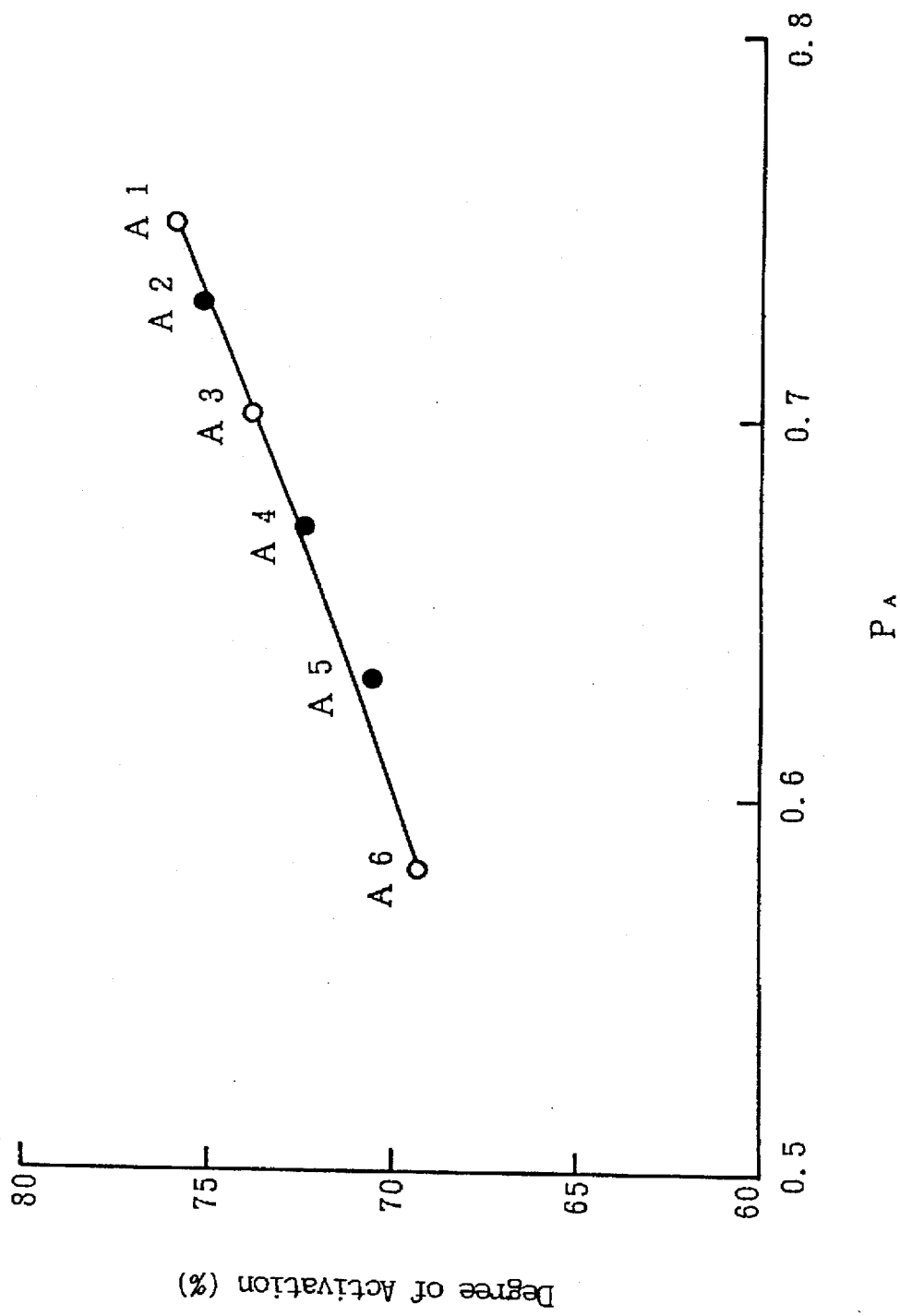
FIG. 12 is a graph showing the relationship between the parameter $P_A$ and the degree of activation.
Figure 13:
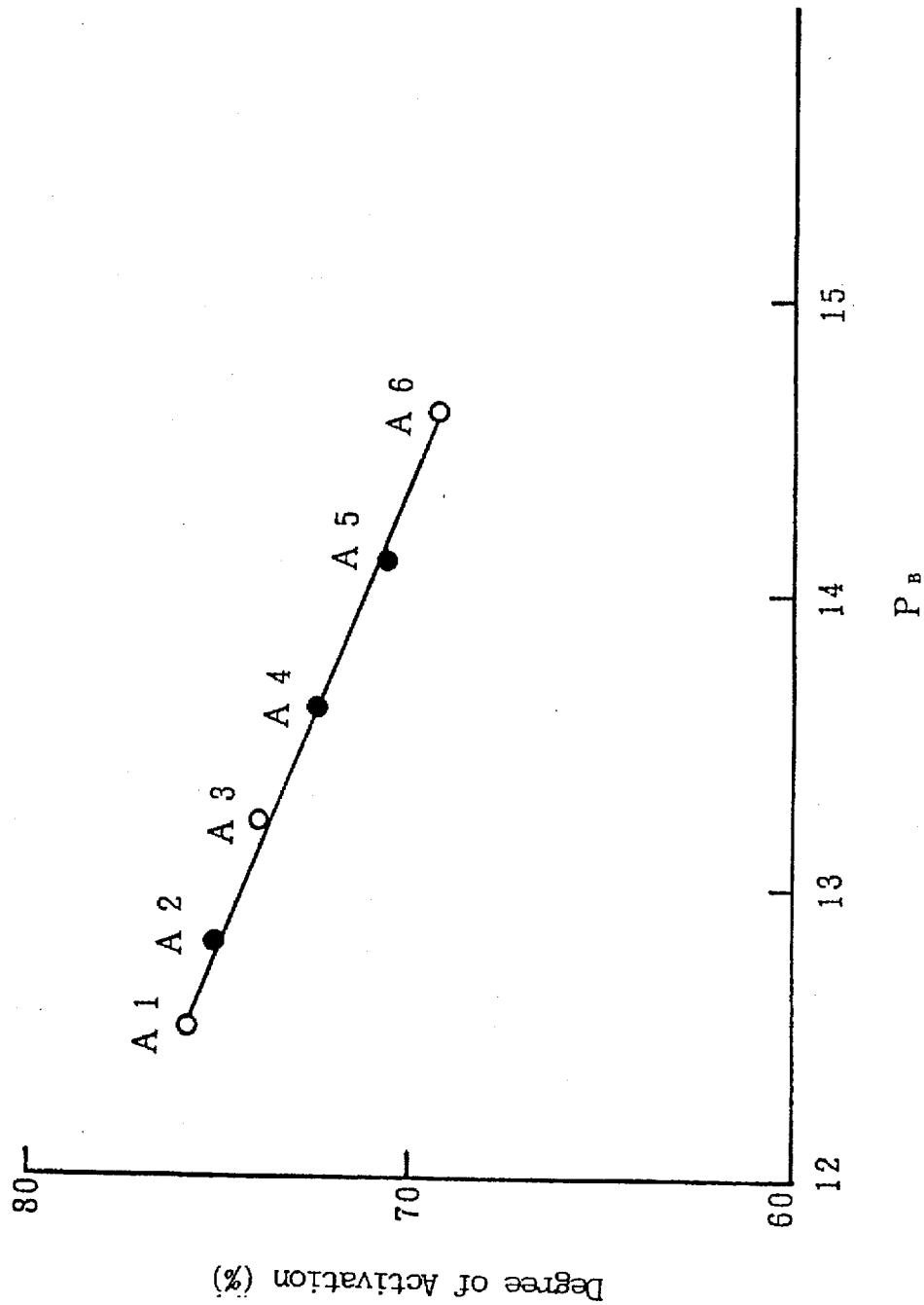
FIG. 13 is a graph showing the relationship between the parameter $P_B$ and the degree of activation.

FIGS. 12 and 13 show the relationship between the degree of activation of each of the test electrodes thus obtained and the parameter $P_A$ and $P_B$, respectively, previously obtained on the hydrogen-absorbing alloys AL1 through AL6. FIG. 12 is a graph with the ordinate representing the degree of activation and abscissa the parameter $P_A$, while FIG. 13 is a graph with the same ordinate and with the abscissa representing the parameter $P_B$.

FIGS. 12 and 13 clearly show that there exists a nearly primary functional (linear) relationship between the degree of activation obtained by actual observation and the parameter $P_A$ or $P_B$ on each of the hydrogen-absorbing alloys.

The following method was used in order to estimate the degree of activation of the test electrodes from the parameter $P_A$ or $P_B$.

Analytical curves (linear lines) showing the relationship between the degrees of activation obtained by actual observation on the test electrodes A1, A3 and A6 and the parameter $P_A$ or $P_B$ were obtained by the non-linear least square method. These analytical lines were drawn in solid lines in FIGS. 12 and 13.

Then, the degree of activation of the test electrodes A2, A4 and A5 were estimated from the analytical lines thus drawn and compared with those obtained by actual observation. The estimation was conducted by locating, on the analytical lines, the points corresponding to the $P_A$'s or $P_B$'s of the hydrogen-absorbing alloys AL2, AL4 and AL5 and reading the ordinate values of the points. The results are shown in Table 7.

TABLE 7

| Test electrode | Degree of activation (%) | | |
|---|---|---|---|
| | Observed | Estimated from $P_A$ | Estimated from $P_B$ |
| A1 | 75.8 | — | — |
| A2 | 75.1 | 75.0 | 75.0 |
| A3 | 73.9 | — | — |
| A4 | 72.5 | 72.7 | 72.5 |
| A5 | 70.7 | 71.2 | 70.9 |
| A6 | 69.3 | — | — |

Table 7 shows that the degree of activation of each of the test electrodes A2, A4 and A5 estimated from the analytical lines are very close to that obtained by actual observation. It is understood from this test that the use of parameter $P_A$ or $P_B$ realizes a very precise estimation of degree of activation.

Example 6

[Preparation of hydrogen-absorbing alloy]

There were mixed Ti, Zr, Ni, Co, V and Mn in an elemental ratio of 0.5:0.5:1.0:0.2:0.5:0.3 and the mixture was melted in an arc melting furnace under an argon atmosphere. The alloy melt thus obtained by arc melting was solidified by dropping onto a roll rotating at a high roll surface speed (liquid quenching method) of $1 \times 10^3$ cm/sec, $2 \times 10^3$ cm/sec, $3 \times 10^3$ cm/sec, $4 \times 10^3$ cm/sec, $5 \times 10^3$ cm/sec or $6 \times 10^3$ cm/sec, to give hydrogen-absorbing alloys AL7 through AL12, in this order, having a composition of $Ti_{0.5}Zr_{0.5}NiCo_{0.2}V_{0.5}Mn_{0.3}$. Separately, a standard alloy having the same composition and having no preferred orientation was prepared by allowing part of the above alloy melt to cool into an alloy block, pulverizing the alloy block into particles having an average diameter of 10 to 30 µm, then heat treating the particles at 800° C. under vacuum for 24 hours and allowing the treated particles to cool to room temperature.

[Calculation of parameters $P_A$ and $P_B$]

The hydrogen-absorbing alloys AL7 through AL12 and the standard hydrogen-absorbing alloy having no preferred orientation were analyzed by X-ray diffractometry. From the obtained patterns, integrated intensities in various lattice planes $(h_1k_1l_1)$, $(h_2k_2l_2)$, ..., $(h_Xk_Xl_X)$ were obtained and their ratios to that of the standard were calculated. These ratios were substituted for $I(hkl)/I_S(hkl)$ and the angles $\phi_1$, $\phi_2$, ..., $\phi_X$ formed by the preferred orientation plane (002) and the lattice planes $(h_1k_1l_1)$, $(h_2k_2l_2)$, ..., $(h_Xk_Xl_X)$ for $\phi$ in the above formula (B).

From the thus obtained simultaneous equations, parameters $P_A$'s and $P_B$'s which relate to the preferred orientation (alloy structure) of the hydrogen-absorbing alloys were obtained by the non-linear least square method. The results are shown in Table 8.

TABLE 8

| Alloy | Roll surface speed (cm/sec) | $P_A$ | $P_B$ |
| --- | --- | --- | --- |
| AL7 | $1 \times 10^3$ | 0.88 | 9.7 |
| AL8 | $2 \times 10^3$ | 0.85 | 9.9 |
| AL9 | $3 \times 10^3$ | 0.83 | 10.4 |
| AL10 | $4 \times 10^3$ | 0.77 | 11.2 |
| AL11 | $5 \times 10^3$ | 0.74 | 11.7 |
| AL12 | $6 \times 10^3$ | 0.69 | 12.5 |

[Evaluation of capacity retention ratio]

Example 5 was repeated except that the above hydrogen-absorbing alloy electrodes AL7 through AL12 were used as test electrodes, to fabricate test cells, which were then tested for the capacity retention ratio (%) at the 100-th cycle under the same conditions as in Example 1.

Figure 14:
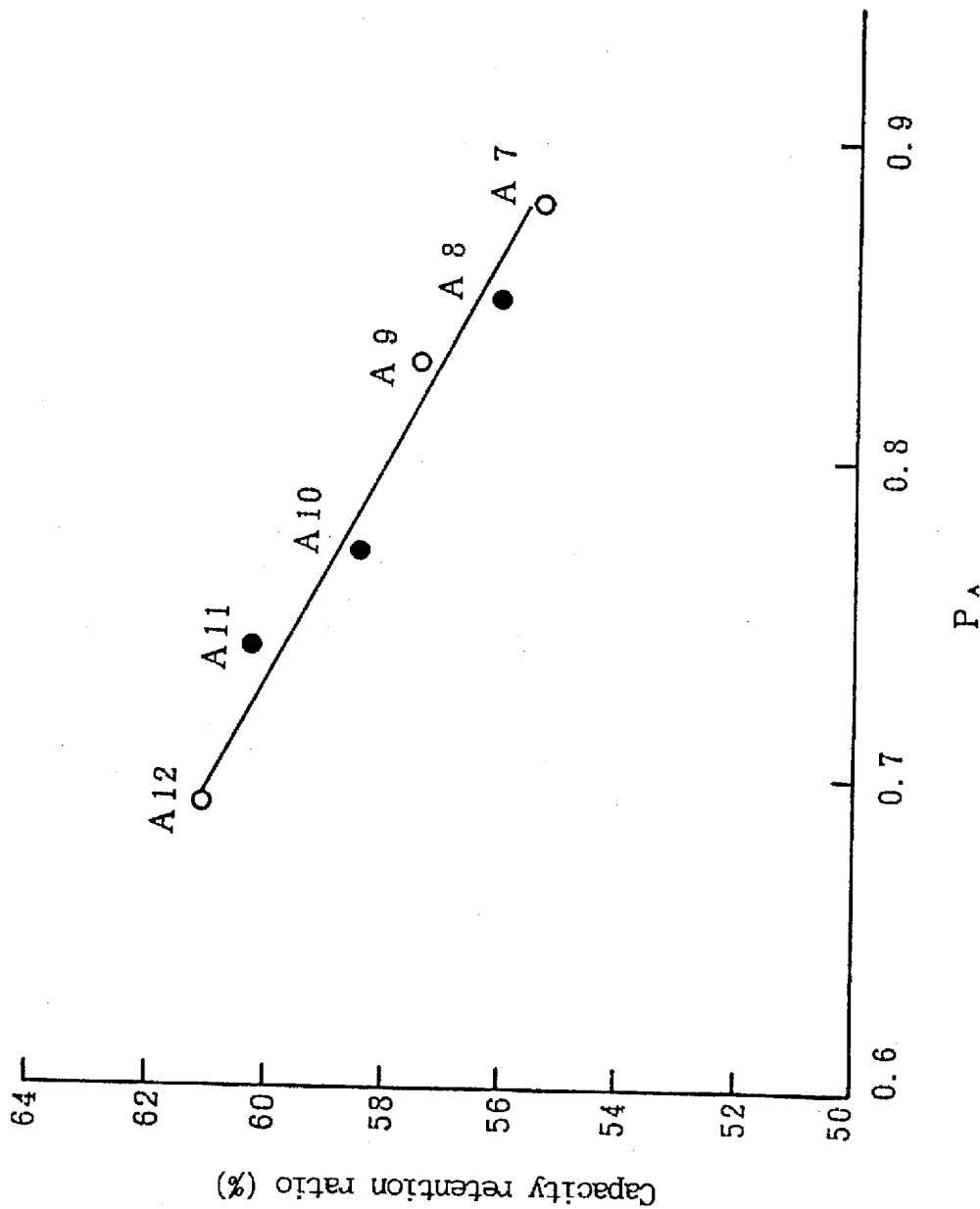
FIG. 14 is a graph showing the relationship between the parameter $P_A$ and the capacity retention ratio.
Figure 15:
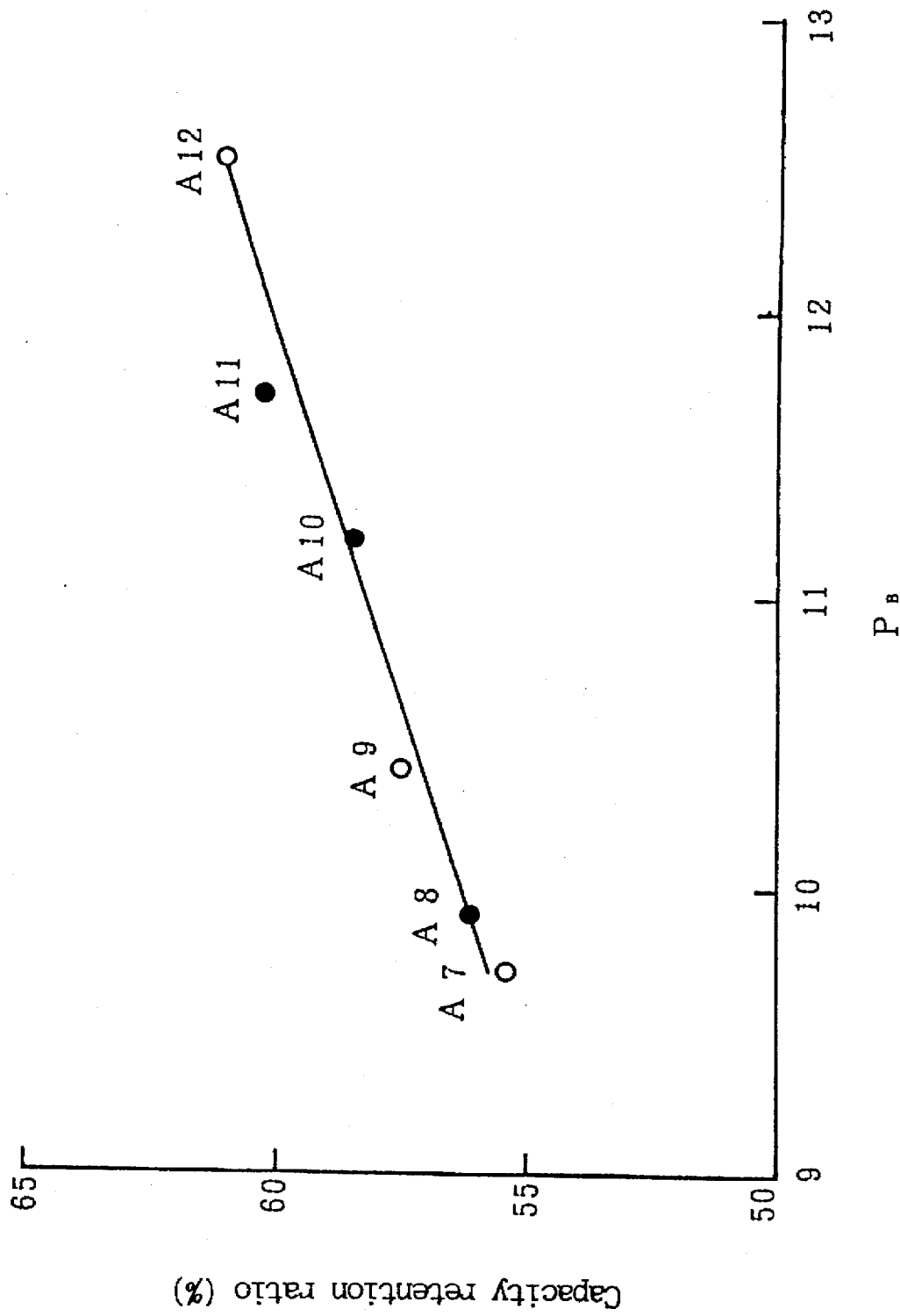
FIG. 15 is a graph showing the relationship between the parameter $P_B$, and the capacity retention ratio.

FIGS. 14 and 15 show the relationship between the capacity retention ratio of each the test electrodes thus obtained and the parameter $P_A$ and $P_B$, respectively, obtained on the hydrogen-absorbing alloys AL7 through AL12. FIG. 14 is a graph with the ordinate representing the capacity retention ratio and abscissa the parameter $P_A$, while FIG. 15 is a graph with the same ordinate and with the abscissa representing the parameter $P_B$.

FIGS. 14 and 15 clearly show that there exists a nearly primary functional (linear) relationship between the capacity retention ratio obtained by actual observation and the parameter $P_A$ or $P_B$ on each of the hydrogen-absorbing alloys.

The following method was used in order to estimate the capacity retention ratio of the test electrodes from the parameter $P_A$ or $P_B$.

Analytical curves (linear lines) showing the relationship between the capacity retention ratios obtained by actual observation on the test electrodes A7, A9 and A12 and the parameter $P_A$ or $P_B$ were obtained by the non-linear least square method. These analytical lines were drawn in solid lines in FIGS. 14 and 15.

Then, the capacity retention ratios of the test electrodes A8, A10 and A11 were estimated from the analytical lines thus drawn and compared with those obtained by actual observation. The estimation was conducted by locating, on the analytical lines, the points corresponding to the abscissa values of $P_A$'s or $P_B$'s of the hydrogen-absorbing alloys AL8, AL10 and AL11 and reading the ordinate values of the points. The results are shown in Table 9.

TABLE 9

| Test electrode | Capacity retention ratio (%) | | |
| --- | --- | --- | --- |
| | Observed | Estimated from $P_A$ | Estimated from $P_B$ |
| A7 | 55.4 | — | — |
| A8 | 56.1 | 56.5 | 56.1 |
| A9 | 57.5 | — | — |
| A10 | 58.5 | 58.9 | 58.7 |
| A11 | 60.3 | 59.7 | 59.6 |
| A12 | 61.1 | — | — |

Table 9 shows that the capacity retention ratios of each of the test electrodes A8, A10 and A11 estimated from the analytical lines are very close to that obtained by actual observation. It is understood from this test that the use of parameter $P_A$ or $P_B$ realizes a very precise estimation of capacity retention ratio.

[Evaluation of degree of activation]

The degree of activation (%) of each of the test cells was obtained in the same manner as in Example 5, i.e. under the same charge-discharge conditions.

Figure 16:
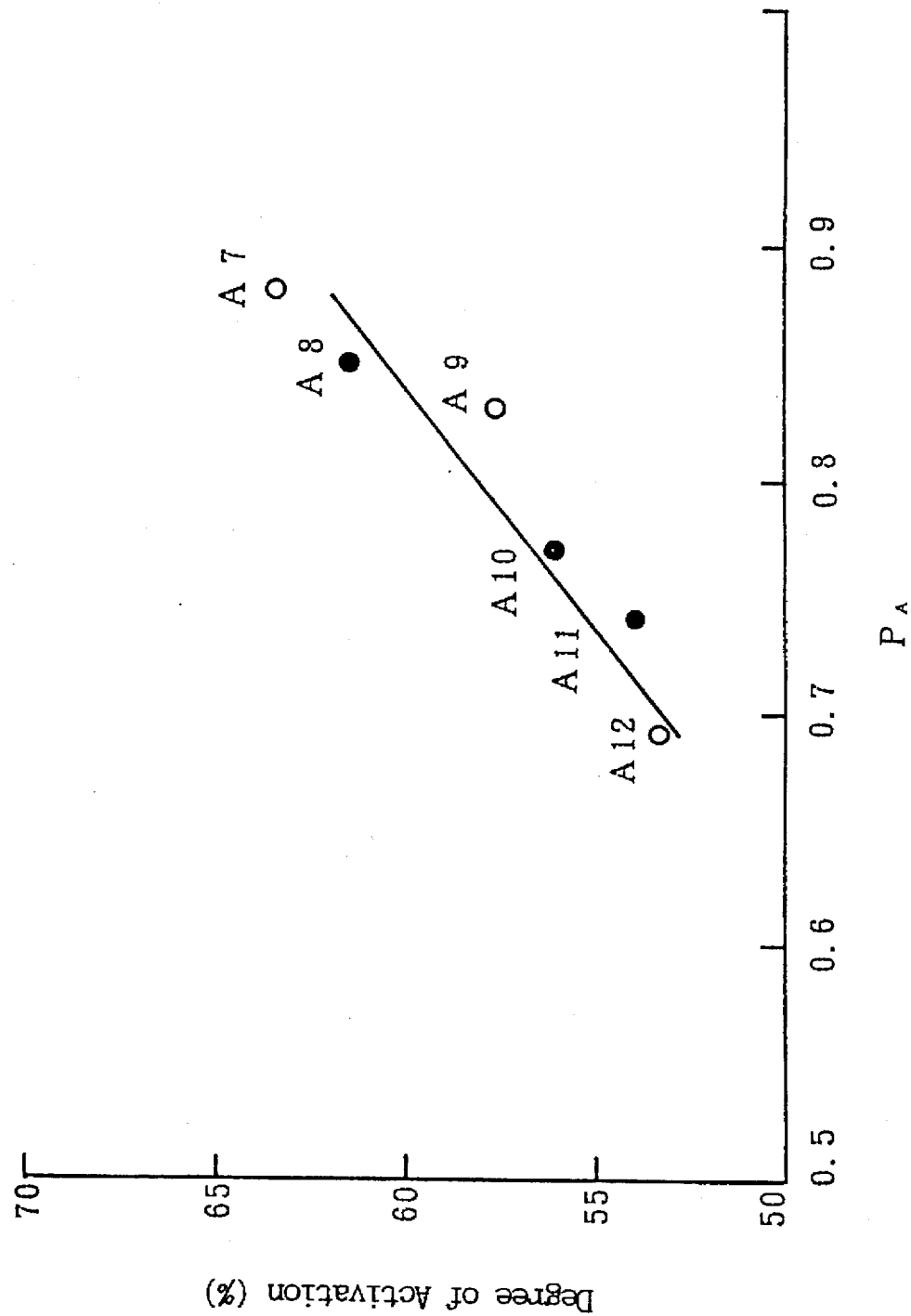
FIG. 16 is a graph showing the relationship between the parameter $P_A$ and the degree of activation.

FIGS. 16 and 17 show the relationship between the degree of activation of each the test electrodes thus obtained and the parameter $P_A$ and $P_B$, respectively, obtained on the hydrogen-absorbing alloys AL7 through AL12. FIG. 16 is a graph with the ordinate representing the degree of activation and abscissa the parameter $P_A$, while FIG. 17 is a graph with the same ordinate and with the abscissa representing the parameter $P_B$.

FIGS. 16 and 17 clearly show that there exists a nearly primary functional (linear) relationship between the degree of activation obtained by actual observation and the parameter $P_A$ or $P_B$ on each of the hydrogen-absorbing alloys.

The following method was used in order to estimate the degree of activation of the test electrodes from the parameter $P_A$ or $P_B$.

Analytical curves (linear lines) showing the relationship between the degrees of activation obtained by actual observation on the test electrodes A7, A9 and A12 and the parameter $P_A$ or $P_B$ were obtained by the non-linear least square method. These analytical lines were drawn in solid lines in FIGS. 16 and 17.

Then, the degree of activation of the test electrodes A8, A10 and A11 were estimated from the analytical lines thus drawn and compared with those obtained by actual observation. The estimation was conducted by locating, on the analytical lines, the points corresponding to the abscissa values of $P_A$'s or $P_B$'s of the hydrogen-absorbing alloys AL8, AL10 and AL11 and reading the ordinate values of the points. The results are shown in Table 10.

TABLE 10

| Test electrode | Degree of activation (%) | | |
| --- | --- | --- | --- |
| | Observed | Estimated from $P_A$ | Estimated from $P_B$ |
| A7 | 63.5 | — | — |
| A8 | 61.5 | 60.6 | 61.3 |
| A9 | 57.6 | — | — |
| A10 | 56.1 | 56.7 | 57.0 |
| A11 | 53.9 | 55.2 | 55.4 |
| A12 | 53.3 | — | — |

Table 10 shows that the degree of activation of each of the test electrodes A8, A10 and A11 estimated from the analytical lines are very close to that obtained by actual observation. It is understood from this test that the use of parameter $P_A$ or $P_B$ realizes a very precise estimation of degree of activation.

As shown in Examples 5 and 6, it is possible to estimate the electrode characteristics of a hydrogen-absorbing alloy by using a common analytical curve, as long as the hydrogen-absorbing alloy has the same composition as those used for preparing the analytical curve. However, to evaluate a hydrogen-absorbing alloy having a different composition, it becomes necessary to prepare a new analytical curve with those having the same composition.

Although Examples 5 and 6 gave explanations while mentioning, as hydrogen-absorbing alloy to be evaluated, $MmNi_{3.1}Co_{0.9}Mn_{0.6}Al_{0.4}$ and $Ti_{0.5}Zr_{0.5}NiCo_{0.2}V_{0.5}Mn_{0.3}$, any type of hydrogen-absorbing alloy can be evaluated by the method of the present invention.

Although Examples 5 and 6 dealt with application of the method of the invention to the evaluation of capacity retention ratio and degree of activation, the method of the present invention can also be applied suitably to other electrode characteristics, such as corrosive resistance and initial capacity.

Although Examples 5 and 6 used as a function $F(\phi)$ satisfying the function $F(\phi)=I(hkl)/I_s(hkl)$, $$F(\phi)=P_A+(1-P_A)\exp(-P_B\cdot\phi^2),$$

any function that determines the electrode characteristics via specific parameters can be used in the method of the invention, with no particular limitation.

Obviously, numerous modifications and variations of the invention are possible in light of the above teachings. It is therefore to be understood that within the scope of the appended claims the invention may be practiced otherwise than as specifically described herein.

What is claimed is:

1. A method for evaluating a hydrogen-absorbing alloy E as an electrode material, comprising the steps of:

(1) measuring integrated intensities of X-ray diffraction peaks $I_{M1}(h_1k_1l_1)$, $I_{M2}(h_2k_2l_2) \ldots, I_{Mx}(h_xk_xl_x)$ in lattice planes $(h_1k_1l_1)$, $(h_2k_2l_2), \ldots (h_xk_xl_x)$, respectively, for a plurality of hydrogen-absorbing alloys $M_1, M_2, \ldots, M_x$, each having a preferred orientation in lattice plane $(h_0k_0l_0)$ and having the same alloy composition as the hydrogen-absorbing alloy E, and measuring integrated intensities of X-ray diffraction peaks $I_s(h_1k_1l_1)$, $I_s(h_2k_2l_2) \ldots, I_s(h_xk_xl_x)$ in lattice planes $(h_1k_1l_1)$, $(h_2k_2l_2), \ldots (h_xk_xl_x)$, respectively, for a hydrogen-absorbing alloy S having the same alloy composition as the hydrogen-absorbing alloy E, determining integrated intensity ratios $I_{M1}(h_1k_1l_1)/I_s(h_1k_1l_1)$, $I_{M2}(h_2k_2l_2)/I_s(h_2k_2l_2), \ldots, I_{Mx}(h_xk_xl_x)/I_s(h_xk_xl_x)$ and angles $\phi_1, \phi_2, \ldots, \phi_x$ formed by the lattice planes $(h_1k_1l_1)$, $(h_2k_2l_2), \ldots, (h_xk_xl_x)$ and the lattice plane $(h_0k_0l_0)$, respectively, and determining a parameter P, which varies according to a structure of the plurality of hydrogen absorbing alloys $M_1, M_2, \ldots, M_x$ and is a parameter of a function $F(\phi)$, where:

$$F(\phi)=I(hkl)/I_s(hkl) \quad (A)$$

wherein $I(hkl)$ is an integrated intensity of the X-ray diffraction peak in lattice plane (hkl) of the plurality of hydrogen-absorbing alloys $M_1, M_2, \ldots, M_x$; $I_s(hkl)$ is an integrated intensity of the X-ray diffraction peak in lattice plane (hkl) of the hydrogen-absorbing alloy S; and $\phi$ is an angle formed by the lattice plane $(h_0k_0l_0)$ and the lattice plane (hkl);

(2) determining a relationship between the parameter P and observed values, $T_1, T_2, \ldots, T_x$ representing at least one property of the plurality of hydrogen-absorbing alloys $M_1, M_2, \ldots, M_x$ as an electrode material;

(3) measuring integrated intensities of X-ray diffraction peaks $I_{E1}(h_{E1}K_{E1}l_{E1})$, $I_{E2}(h_{E2}K_{E2}l_{E2}), \ldots, I_{EY}(h_{EY}k_{EY}l_{EY})$ in lattice planes, $(h_{E1}k_{E1}l_{E1})$, $(h_{E2}k_{E2}l_{E2}), \ldots, (h_{EY}k_{EY}l_{EY})$, respectively, for the hydrogen-absorbing alloy E, determining integrated intensity ratios $I_{E1}(h_{E1}k_{E1}l_{E1})/I_s(h_{E1}k_{E1}l_{E1})$, $I_{E2}(h_{E2}k_{E2}l_{E2})/I_s(h_{E2}k_{E2}l_{E2}), \ldots, I_{EY}(h_{EY}k_{EY}l_{EY})/I_s(h_{EY}k_{EY}l_{EY})$ and angles $\phi_{E1}, \phi_{E2}, \ldots, \phi_{EY}$ formed by the lattice planes $(h_{E1}k_{E1}l_{E1})$, $(h_{E2}k_{E2}l_{E2}), \ldots, (h_{EY}k_{EY}l_{EY})$ and the lattice plane $(h_0k_0l_0)$, respectively, and determining a parameter $P_E$ for the hydrogen-absorbing alloy E by substituting the determined integrated intensity ratios and angles for $I(hkl)/I_s(hkl)$ and $\phi$ in formula (A); and (4) comparing the parameter $P_E$ with the relationship between the parameter P and the observed values $T_1, T_2, \ldots, T_x$ in step (2) to estimate at least one property of the hydrogen-absorbing alloy E, as an electrode material;

wherein the hydrogen-absorbing alloy E is used as a negative electrode of a metal hydride alkaline secondary battery.

2. The method of claim 1, wherein the lattice planes $(h_{E1}k_{E1}l_{E1})$, $(h_{E2}k_{E2}l_{E2}), \ldots, (h_{EY}k_{EY}l_{EY})$ are equal to the lattice planes $(h_1k_1l_1)$, $(h_2k_2l_2), \ldots, (h_xk_xl_x)$, respectively.

3. A method for evaluating a hydrogen-absorbing alloy E as an electrode material, comprising the steps of:

(1) measuring integrated intensities of X-ray diffraction peaks $I_{M1}(h_1k_1l_1)$, $I_{M2}(h_2k_2l_2) \ldots, I_{Mx}(h_xk_xl_x)$ in lattice planes $(h_1k_1l_1)$, $(h_2k_2l_2), \ldots (h_xk_xl_x)$, respectively, for a plurality of hydrogen-absorbing alloys $M_1, M_2, \ldots, M_x$, each having a preferred orientation in lattice plane $(h_0K_0l_0)$ and having the same alloy composition as the hydrogen-absorbing alloy E, and measuring integrated intensities of X-ray diffraction peaks $I_s(h_1k_1l_1)$, $I_s(h_2k_2l_2) \ldots, I_s(h_xk_xl_x)$ in lattice planes $(h_1k_1l_1)$, $(h_2k_2l_2), \ldots (h_xk_xl_x)$, respectively, for a hydrogen-absorbing alloy S having the same alloy composition as the hydrogen-absorbing alloy E, determining integrated intensity ratios $I_{M1}(h_1k_1l_1)/I_s(h_1k_1l_1)$, $I_{M2}(h_2k_2l_2)/I_s(h_2k_2l_2), \ldots, I_{Mx}(h_xk_xl_x)/I_s(h_xk_xl_x)$ and angles $\phi_1, \phi_2, \ldots, \phi_x$ formed by the lattice planes $(h_1k_1l_1)$, $(h_2k_2l_2), \ldots, (h_xk_xl_x)$ and the lattice plane $(h_0k_0l_0)$, respectively, and determining a parameter P, which varies according to a structure of the plurality of hydrogen absorbing alloys $M_1, M_2, \ldots, M_x$ and is a parameter of a function $F(\phi)$, where:

$$F(\phi)=I(hkl)/I_s(hkl) \quad (A)$$

wherein $I(hkl)$ is an integrated intensity of the X-ray diffraction peak in lattice plane (hkl) of the plurality of hydrogen-absorbing alloys $M_1, M_2, \ldots, M_x$; $I_s(hkl)$ is an integrated intensity of the X-ray diffraction peak in lattice plane (hkl) of the hydrogen-absorbing alloy S; and $\phi$ is an angle formed by the lattice plane $(h_0k_0l_0)$ and the lattice plane (hkl);

(2) determining a relationship between the parameter P and observed values, $T_1, T_2, \ldots, T_x$ representing at least one property of the plurality of hydrogen-absorbing alloys $M_1, M_2, \ldots, M_x$ as an electrode material;

(3) measuring integrated intensities of X-ray diffraction peaks $I_{E1}(h_{E1}K_{E1}l_{E1})$, $I_{E2}(h_{E2}K_{E2}l_{E2}), \ldots, I_{EY}(h_{EY}k_{EY}l_{EY})$ in lattice planes, $(h_{E1}k_{E1}l_{E1})$, $(h_{E2}k_{E2}l_{E2}), \ldots, (h_{EY}k_{EY}l_{EY})$, respectively, for the hydrogen-absorbing alloy E, determining integrated intensity ratios $I_{E1}(h_{E1}k_{E1}l_{E1})/I_s(h_{E1}k_{E1}l_{E1})$, $I_{E2}(h_{E2}k_{E2}l_{E2})/I_s(h_{E2}k_{E2}l_{E2}), \ldots, I_{EY}(h_{EY}k_{EY}l_{EY})/I_s(h_{EY}k_{EY}l_{EY})$, and angles $\phi_{E1}, \phi_{E2}, \ldots, \phi_{EY}$ formed by the lattice planes $(h_{E1}k_{E1}l_{E1})$, $(h_{E2}k_{E2}l_{E2}), \ldots, (h_{EY}k_{EY}l_{EY})$ and the lattice plane $(h_0k_0l_0)$, respectively, and determining a parameter $P_E$ for the hydrogen-absorbing alloy E by substituting the determined integrated intensity ratios and angles for $I(hkl)/I_s(hkl)$ and $\phi$ in formula (A); and (4) comparing the parameter $P_E$ with the relationship between the parameter P and the observed values $T_1$, $T_2, \ldots T_x$ in step (2) to estimate at least one property of the hydrogen-absorbing alloy E, as an electrode material;

wherein the hydrogen-absorbing alloy E is an $AB_5$ alloy, where A is at least one element selected from the group consisting of rare earth metals and B is at least one transition element selected from the group consisting of Cr, Mn, Fe, Co, Mi, Cu, Sn, and Al, or an $AB_2$ alloy, where A is at least one element selected from the group consisting of Ti, Zr, Cr, V and alkali earth metals and B is at least one transition element selected from the group consisting of Cr, Mn, Fe, Co, Ni, Cu, Sn, and Al.

4. A method for evaluating a hydrogen-absorbing alloy E as an electrode material, comprising the steps of:

(1) measuring integrated intensities of X-ray diffraction peaks $I_{M1}(h_1k_1l_1)$, $I_{M2}(h_2k_2l_2) \ldots, I_{Mx}(h_xk_xl_x)$ in lattice planes $(h_1k_1l_1)$, $(h_2k_2l_2), \ldots, (h_xk_xl_x)$, respectively, for a plurality of hydrogen-absorbing alloys $M_1, M_2, \ldots, M_x$, each having a preferred orientation in lattice plane $(h_0K_0l_0)$ and having the same alloy composition as the hydrogen-absorbing alloy E, and measuring integrated intensities of X-ray diffraction peaks $I_s(h_1k_1l_1)$, $I_s(h_2k_2l_2) \ldots, I_s(h_xk_xl_x)$ in lattice planes $(h_1k_1l_1)$, $(h_2k_2l_2), \ldots (h_xk_xl_x)$, respectively, for a hydrogen-absorbing alloy S having the same alloy composition as the hydrogen-absorbing alloy E, determining integrated intensity ratios $I_{M1}(h_1k_1l_1)/I_s(h_1k_1l_1)$, $I_{M2}(h_2k_2l_2)/I_s(h_2k_2l_2), \ldots, I_{Mx}(h_xk_xl_x)/I_s(h_xk_xl_x)$ and angles $\phi_1, \phi_2, \ldots, \phi_x$ formed by the lattice planes $(h_1k_1l_1)$, $(h_2k_2l_2), \ldots, (h_xk_xl_x)$ and the lattice plane $(h_0k_0l_0)$, respectively, and determining a parameter P, which varies according to a structure of the plurality of hydrogen absorbing alloys $M_1, M_2, \ldots, M_x$ and is a parameter of a function $F(\phi)$, where:

$$F(\phi)=I(hkl)/I_s(hkl) \qquad (A)$$

wherein I(hkl) is an integrated intensity of the X-ray diffraction peak in lattice plane (hkl) of the plurality of hydrogen-absorbing alloys $M_1, M_2, \ldots, M_x$; $I_s$(hkl) is an integrated intensity of the X-ray diffraction peak in lattice plane (hkl) of the hydrogen-absorbing alloy S; and $\phi$ is an angle formed by the lattice plane $(h_0k_0l_0)$ and the lattice plane (hkl);

(2) determining a relationship between the parameter P and observed values, $T_1, T_2, \ldots, T_x$ representing at least one property of the plurality of hydrogen-absorbing alloys $M_1, M_2, \ldots, M_x$ as an electrode material;

(3) measuring integrated intensities of X-ray diffraction peaks $I_{E1}(h_{E1}K_{E1}l_{E1})$, $I_{E2}(h_{E2}K_{E2}l_{E2}), \ldots, I_{EY}(h_{EY}k_{EY}l_{EY})$ in lattice planes, $(h_{E1}k_{E1}l_{E1})$, $(h_{E2}k_{E2}l_{E2}), \ldots, (h_{EY}k_{EY}l_{EY})$, respectively, for the hydrogen-absorbing alloy E, determining integrated intensity ratios $I_{E1}(h_{E1}k_{E1}l_{E1})/I_s(h_{E1}k_{E1}l_{E1})$, $I_{E2}(h_{E2}k_{E2}l_{E2})/I_s(h_{E2}k_{E2}l_{E2}), \ldots, I_{EY}(h_{EY}k_{EY}l_{EY})/I_s(h_{EY}k_{EY}l_{EY})$, and angles $\phi_{E1}, \phi_{E2}, \ldots, \phi_{EY}$ formed by the lattice planes $(h_{E1}k_{E1}l_{E1})$, $(h_{E2}k_{E2}l_{E2}), \ldots, (h_{EY}k_{EY}l_{EY})$ and the lattice plane $(h_0k_0l_0)$, respectively, and determining a parameter $P_E$ for the hydrogen-absorbing alloy E by substituting the determined integrated intensity ratios and angles for $I(hkl)/I_s(hkl)$ and $\phi$ in formula (A); and (4) comparing the parameter $P_E$ with the relationship between the parameter P and the observed values $T_1$, $T_2, \ldots T_x$ in step (2) to estimate at least one property of the hydrogen-absorbing alloy E, as an electrode material;

wherein said method evaluates a crystal lattice of the hydrogen-absorbing alloy E for swelling or shrinking stress.

5. A method for evaluating a hydrogen-absorbing alloy E as an electrode material, comprising the steps of:

(1) measuring integrated intensities of X-ray diffraction peaks $I_{M1}(h_1k_1l_1)$, $I_{M2}(h_2k_2l_2) \ldots, I_{Mx}(h_xk_xl_x)$ in lattice planes $(h_1k_1l_1)$, $(h_2k_2l_2), \ldots, (h_xk_xl_x)$, respectively, for a plurality of hydrogen-absorbing alloys $M_1, M_2, \ldots, M_x$, each having a preferred orientation in lattice plane $(h_0K_0l_0)$ and having the same alloy composition as the hydrogen-absorbing alloy E, and measuring integrated intensities of X-ray diffraction peaks $I_s(h_1k_1l_1)$, $I_s(h_2k_2l_2) \ldots, I_s(h_xk_xl_x)$ in lattice planes $(h_1k_1l_1)$, $(h_2k_2l_2), \ldots (h_xk_xl_x)$, respectively, for a hydrogen-absorbing alloy S having the same alloy composition as the hydrogen-absorbing alloy E, determining integrated intensity ratios $I_{M1}(h_1k_1l_1)/I_s(h_1k_1l_1)$, $I_{M2}(h_2k_2l_2)/I_s(h_2k_2l_2), \ldots, I_{Mx}(h_xk_xl_x)/I_s(h_xk_xl_x)$ and angles $\phi_1, \phi_2, \ldots, \phi_x$ formed by the lattice planes $(h_1k_1l_1)$, $(h_2k_2l_2), \ldots, (h_xk_xl_x)$ and the lattice plane $(h_0k_0l_0)$, respectively, and determining a parameter P, which varies according to a structure of the plurality of hydrogen absorbing alloys $M_1, M_2, \ldots, M_x$ and is a parameter of a function $F(\phi)$, where:

$$F(\phi)=I(hkl)/I_s(hkl) \qquad (A)$$

wherein I(hkl) is an integrated intensity of the X-ray diffraction peak in lattice plane (hkl) of the plurality of hydrogen-absorbing alloys $M_1, M_2, \ldots, M_x$; $I_s$(hkl) is an integrated intensity of the X-ray diffraction peak in lattice plane (hkl) of the hydrogen-absorbing alloy S; and $\phi$ is an angle formed by the lattice plane $(h_0k_0l_0)$ and the lattice plane (hkl);

(2) determining a relationship between the parameter P and observed values, $T_1, T_2, \ldots, T_x$ representing at least one property of the plurality of hydrogen-absorbing alloys $M_1, M_2, \ldots, M_x$ as an electrode material;

(3) measuring integrated intensities of X-ray diffraction peaks $I_{E1}(h_{E1}K_{E1}l_{E1})$, $I_{E2}(h_{E2}K_{E2}l_{E2}), \ldots, I_{EY}(h_{EY}k_{EY}l_{EY})$ in lattice planes, $(h_{E1}k_{E1}l_{E1})$, $(h_{E2}k_{E2}l_{E2}), \ldots, (h_{EY}k_{EY}l_{EY})$, respectively, for the hydrogen-absorbing alloy E, determining integrated intensity ratios $I_{E1}(h_{E1}k_{E1}l_{E1})/I_s(h_{E1}k_{E1}l_{E1})$, $I_{E2}(h_{E2}k_{E2}l_{E2})/I_s(h_{E2}k_{E2}l_{E2}), \ldots, I_{EY}(h_{EY}k_{EY}l_{EY})/I_s(h_{EY}k_{EY}l_{EY})$, and angles $\phi_{E1}, \phi_{E2}, \ldots, \phi_{EY}$ formed by the lattice planes $(h_{E1}k_{E1}l_{E1})$, $(h_{E2}k_{E2}l_{E2}), \ldots, (h_{EY}k_{EY}l_{EY})$ and the lattice plane $(h_0k_0l_0)$, respectively, and determining a parameter $P_E$ for the hydrogen-absorbing alloy E by substituting the determined integrated intensity ratios and angles for $I(hkl)/I_s(hkl)$ and $\phi$ in formula (A); and (4) comparing the parameter $P_E$ with the relationship between the parameter P and the observed values $T_1$, $T_2, \ldots T_x$ in step (2) to estimate at least one property of the hydrogen-absorbing alloy E, as an electrode material;

wherein the at least one property of the hydrogen-absorbing alloy E estimated in said step (4) is one of corrosion resistance, initial electrode capacity, retention of capacity, and a degree of activation.

6. A method for evaluating a hydrogen-absorbing alloy E as an electrode material, comprising the steps of:

(1) measuring integrated intensities of X-ray diffraction peaks $I_{M1}(h_1k_1l_1)$, $I_{M2}(h_2k_2l_2)$ ..., $I_{Mx}(h_xk_xl_x)$ in lattice planes $(h_1k_1l_1)$, $(h_2k_2l_2)$, ... $(h_xk_xl_x)$, respectively, for a plurality of hydrogen-absorbing alloys $M_1, M_2, \ldots, M_X$, each having a preferred orientation in lattice plane $(h_0k_0l_0)$ and having the same alloy composition as the hydrogen-absorbing alloy E, and measuring integrated intensities of X-ray diffraction peaks $I_s(h_1k_1l_1)$, $I_s(h_2k_2l_2) \ldots$, $I_s(h_xk_xl_x)$ in lattice planes $(h_1k_1l_1)$, $(h_2k_2l_2)$, ..., $(h_xk_xl_x)$, respectively, for a hydrogen-absorbing alloy S having the same alloy composition as the hydrogen-absorbing alloy E, determining integrated intensity ratios $I_{M1}(h_1k_1l_1)/I_s(h_1k_1l_1)$, $I_{M2}(h_2k_2l_2)/I_s(h_2k_2l_2)$, ..., $I_{MX}(h_xk_xl_x)/I_s(h_xk_xl_x)$ and angles $\phi_1, \phi_2, \ldots, \phi_X$ formed by the lattice plane $(h_1k_1l_1)$, $(h_2k_2l_2)$, ..., $(h_Xk_Xl_X)$ and the lattice plane $(h_0k_0l_0)$, respectively, and determining parameters $P_A$ and $P_B$, which vary according to a structure of the plurality of hydrogen absorbing alloys $M_1, M_2, \ldots, M_x$ and are parameters of a function $F(\phi)$, where:

$$F(\phi)=P_A+(1-P_A)\exp(-P_B\cdot\phi^2)=I(hkl)/I_S(hkl) \quad \text{(B)}$$

wherein I(hkl) is an integrated intensity of the X-ray diffraction peak in lattice plane (hkl) of the plurality of hydrogen-absorbing alloys $M_1, M_2, \ldots, M_X$; $I_S$(hkl) is an integrated intensity of the X-ray diffraction peak in lattice plane (hkl) of the hydrogen-absorbing alloy S; and $\phi$ is an angle formed by the lattice plane $(h_0k_0l_0)$ and the lattice plane (hkl);

(2) determining a relationship between the parameters $P_A$ and/or $P_B$ and observed values, $T_1, T_2, \ldots, T_X$ representing at least one property of the plurality of hydrogen-absorbing alloys $M_1, M_2, \ldots, M_X$ as an electrode material;

(3) measuring integrated intensities of X-ray diffraction peaks $I_{E1}(h_{E1}k_{E1}l_{E1})$, $I_{E2}(h_{E2}k_{E2}l_{E2})$, ..., $I_{EY}(h_{EY}k_{EY}l_{EY})$ in selected lattice planes, $(h_{E1}k_{E1}l_{E1})$, $(h_{E2}k_{E2}l_{E2})$, ..., $(h_{EY}k_{EY}l_{EY})$, respectively, for the hydrogen-absorbing alloy E, determining integrated intensity ratios $I_{E1}(h_{E1}k_{E1}l_{E1})/I_S(h_{E1}k_{E1}l_{E1})$, $I_{E2}(h_{E2}k_{E2}l_{E2})/I_S(h_{E2}k_{E2}l_{E2})$, ..., $I_{EY}(h_{EY}k_{EY}l_{EY})/I_S(h_{EY}k_{EY}l_{EY})$ and angles $\phi_{E1}, \phi_{E2}, \ldots, \phi_{EY}$ formed by the lattice planes $(h_{E1}k_{E1}l_{E1})$, $(h_{E2}k_{E2}l_{E3})$, ..., $(h_{EY}k_{EY}l_{EY})$ and the lattice plane $(h_0k_0l_0)$, respectively, and determining parameters $P_{EA}$ and/or $P_{EB}$ for the hydrogen-absorbing alloy E, by substituting the determined integrated intensity ratios and angle for $I(hkl)/I_S(hkl)$ and $\phi$ in formula (B); and (4) comparing the parameters $P_{EA}$ and/or $P_{EB}$ with the relationship between parameters $P_A$ and/or $P_B$ and the observed values $T_1, T_2, \ldots, T_x$ in step (2) to estimate at least one property of the hydrogen-absorbing alloy E as an electrode material;

wherein the hydrogen-absorbing alloy E is used as a negative electrode of a metal hydride alkaline secondary battery.

7. The method of claim 6, wherein the lattice planes $(h_{E1}k_{E1}l_{E1})$, $(h_{E2}k_{E2}l_{E2})$, ..., $(h_{EY}k_{EY}l_{EY})$ are equal to the lattice planes $(h_1k_1l_1)$, $(h_2k_2l_2)$, ..., $(h_xk_xl_x)$, respectively.

8. A method for evaluating a hydrogen-absorbing alloy E as an electrode material, comprising the steps of:

(1) measuring integrated intensities of X-ray diffraction peaks $I_{M1}(h_1k_1l_1)$, $I_{M2}(h_2k_2l_2) \ldots$, $I_{Mx}(h_xk_xl_x)$ in lattice planes $(h_1k_1l_1)$, $(h_2k_2l_2)$, ... $(h_xk_xl_x)$, respectively, for a plurality of hydrogen-absorbing alloys $M_1, M_2, \ldots, M_X$, each having a preferred orientation in lattice plane $(h_0k_0l_0)$ and having the same alloy composition as the hydrogen-absorbing alloy E, and measuring integrated intensities of X-ray diffraction peaks $I_s(h_1k_1l_1)$, $I_s(h_2k_2l_2) \ldots$, $I_s(h_xk_xl_x)$ in lattice planes $(h_1k_1l_1)$, $(h_2k_2l_2)$, ..., $(h_xk_xl_x)$, respectively, for a hydrogen-absorbing alloy S having the same alloy composition as the hydrogen-absorbing alloy E, determining integrated intensity ratios $I_{M1}(h_1k_1l_1)/I_S(h_1k_1l_1)$, $I_{M2}(h_2k_2l_2)/I_S(h_2k_2l_2)$, ..., $I_{MX}(h_xk_xl_x)/I_S(h_xk_xl_x)$ and angles $\phi_1, \phi_2, \ldots, \phi_X$ formed by the lattice planes $(h_1k_1l_1)$, $(h_2k_2l_2)$, ..., $(h_Xk_Xl_X)$ and the lattice plane $(h_0k_0l_0)$, respectively, and determining parameters $P_A$ and $P_B$, which vary according to a structure of the plurality of hydrogen absorbing alloys $M_1, M_2, \ldots, M_x$ and are parameters of a function $F(\phi)$, where:

$$F(\phi)=P_A+(1-P_A)\exp(-P_B\cdot\phi^2)=I(hkl)/I_S(hkl) \quad \text{(B)}$$

wherein I(hkl) is an integrated intensity of the X-ray diffraction peak in lattice plane (hkl) of the plurality of hydrogen-absorbing alloys $M_1, M_2, \ldots, M_X$; $I_S$(hkl) is an integrated intensity of the X-ray diffraction peak in lattice plane (hkl) of the hydrogen-absorbing alloy S; and $\phi$ is an angle formed by the lattice plane $(h_0k_0l_0)$ and the lattice plane (hkl);

(2) determining a relationship between the parameters $P_A$ and/or $P_B$ and observed values, $T_1, T_2, \ldots, T_X$ representing at least one property of the plurality of hydrogen-absorbing alloys $M_1, M_2, \ldots, M_X$ as an electrode material;

(3) measuring integrated intensities of X-ray diffraction peaks $I_{E1}(h_{E1}k_{E1}l_{E1})$, $I_{E2}(h_{E2}k_{E2}l_{E2})$, ..., $I_{EY}(h_{EY}k_{EY}l_{EY})$ in selected lattice planes $(h_{E1}k_{E1}l_{E1})$, $(h_{E2}k_{E2}l_{E2})$, ..., $(h_{EY}k_{EY}l_{EY})$, respectively, for the hydrogen-absorbing alloy E, determining integrated intensity ratios $I_{E1}(h_{E1}k_{E1}l_{E1})/I_S(h_{E1}k_{E1}l_{E1})$, $I_{E2}(h_{E2}k_{E2}l_{E2})/I_S(h_{E2}k_{E2}l_{E2})$, ..., $I_{EY}(h_{EY}k_{EY}l_{EY})/I_S(h_{EY}k_{EY}l_{EY})$ and angles $\phi_{E1}, \phi_{E2}, \ldots \phi_{EY}$ formed by the lattice planes $(h_{E1}k_{E1}l_{E1})$, $(h_{E2}k_{E2}l_{E3})$, ..., $(h_{EY}k_{EY}l_{EY})$ and the lattice plane $(h_0k_0l_0)$, respectively, and determining parameters $P_{EA}$ and/or $P_{EB}$ for the hydrogen-absorbing alloy E, by substituting the determined integrated intensity ratios and angles for $I(hkl)/I_S(hkl)$ and $\phi$ in formula (B); and (4) comparing the parameters $P_{EA}$ and/or $P_{EB}$ with the relationship between the parameters $P_A$ and/or $P_B$ and the observed values $T_1, T_2, \ldots T_x$ in step (2) to estimate at least one property of the hydrogen-absorbing alloy E as an electrode material;

wherein the hydrogen-absorbing alloy E is an $AB_5$ alloy, where A is at least one element selected from the group consisting of rare earth metals and B is at least one transition element selected from the group consisting of Cr, Mn, Fe, Co, Mi, Cu, Sn, and Al, or an $AB_2$ alloy, where A is at least one element selected from the group consisting of Ti, Zr, Cr, V and alkali earth metals and B is at least one transition element selected from the group consisting of Cr, Mn, Fe, Co, Ni, Cu, Sn, and Al.

9. A method for evaluating a hydrogen-absorbing alloy E as an electrode material, comprising the steps of:

(1) measuring integrated intensities of X-ray diffraction peaks $I_{M1}(h_1k_1l_1)$, $I_{M2}(h_2k_2l_2)$ ..., $I_{Mx}(h_xk_xl_x)$ in lattice planes $(h_1k_1l_1)$, $(h_2k_2l_2)$, ..., $(h_xk_xl_x)$, respectively, for a plurality of hydrogen-absorbing alloys $M_1, M_2, \ldots, M_X$, each having a preferred orientation in lattice plane $(h_0k_0l_0)$ and having the same alloy composition as the hydrogen-absorbing alloy E, and measuring integrated intensities of X-ray diffraction peaks $I_s(h_1k_1l_1)$, $I_s(h_2k_2l_2)$ ..., $I_s(h_xk_xl_x)$ in lattice planes $(h_1k_1l_1)$, $(h_2k_2l_2)$, ... $(h_xk_xl_x)$, respectively, for a hydrogen-absorbing alloy S having the same alloy composition as the hydrogen-absorbing alloy E, determining integrated intensity ratios $I_{M1}(h_1k_1l_1)/I_S(h_1k_1l_1)$, $I_{M2}(h_2k_2l_2)/I_S(h_2k_2l_2)$, ..., $I_{MX}(h_xk_xl_x)/I_S(h_xk_xl_x)$ and angles $\phi_1, \phi_2, \ldots, \phi_X$ formed by the lattice plane $(h_1k_1l_1)$, $(h_2k_2l_2)$, ..., $(h_Xk_Xl_X)$ and the lattice plane $(h_0k_0l_0)$, respectively, and determining parameters $P_A$ and $P_B$, which vary according to a structure of the plurality of hydrogen absorbing alloys $M_1, M_2, \ldots, M_x$ and are parameters of a function $F(\phi)$, where:

$$F(\phi)=P_A+(1-P_A)\exp(-P_B\cdot\phi^2)=I(hkl)/I_S(hkl) \quad (B)$$

wherein $I(hkl)$ is an integrated intensity of the X-ray diffraction peak in lattice plane (hkl) of the plurality of hydrogen-absorbing alloys $M_1, M_2, \ldots, M_X$; $I_S(hkl)$ is an integrated intensity of the X-ray diffraction peak in lattice plane (hkl) of the hydrogen-absorbing alloy S; and $\phi$ is an angle formed by the lattice plane $(h_0k_0l_0)$ and the lattice plane (hkl);

(2) determining a relationship between the parameters $P_A$ and/or $P_B$ and observed values, $T_1, T_2, \ldots, T_X$ representing at least one property of the plurality of hydrogen-absorbing alloys $M_1, M_2, \ldots, M_X$ as an electrode material;

(3) measuring integrated intensities of X-ray diffraction peaks $I_{E1}(h_{E1}k_{E1}l_{E1})$, $I_{E2}(h_{E2}k_{E2}l_{E2})$, ..., $I_{EY}(h_{EY}k_{EY}l_{EY})$ in selected lattice planes $(h_{E1}k_{E1}l_{E1})$, $(h_{E2}k_{E2}l_{E2})$, ..., $(h_{EY}k_{EY}l_{EY})$, respectively, for the hydrogen-absorbing alloy E, determining integrated intensity ratios $I_{E1}(h_{E1}k_{E1}l_{E1})/I_S(h_{E1}k_{E1}l_{E1})$, $I_{E2}(h_{E2}k_{E2}l_{E2})/I_S(h_{E2}k_{E2}l_{E2})$, ..., $I_{EY}(h_{EY}k_{EY}l_{EY})/I_S(h_{EY}k_{EY}l_{EY})$, and angles $\phi_{E1}, \phi_{E2}, \ldots, \phi_{EY}$ formed by the lattice planes $(h_{E1}k_{E1}l_{E1})$, $(h_{E2}k_{E2}l_{E3})$, ..., $(h_{EY}k_{EY}l_{EY})$ and the lattice plane $(h_0k_0l_0)$, respectively, and determining parameters $P_{EA}$ and/or $P_{EB}$ for the hydrogen-absorbing alloy E, by substituting the determined integrated intensity ratios and angles for $I(hkl)/I_S(hkl)$ and $\phi$ in formula (B); and (4) comparing the parameters $P_{EA}$ and/or $P_{EB}$ with the relationship between the parameters $P_A$ and/or $P_B$ and the observed values $T_1, T_2, \ldots, T_x$ in step (2) to estimate at least one property of the hydrogen-absorbing alloy E, as an electrode material;

wherein said method evaluates a crystal lattice of the hydrogen-absorbing alloy E for swelling or shrinking stress.

10. A method for evaluating a hydrogen-absorbing alloy E as an electrode material, comprising the steps of:

(1) measuring integrated intensities of X-ray diffraction peaks $I_{M1}(h_1k_1l_1)$, $I_{M2}(h_2k_2l_2)$ ..., $I_{Mx}(h_xk_xl_x)$ in lattice planes $(h_1k_1l_1)$, $(h_2k_2l_2)$, ... $(h_xk_xl_x)$, respectively, for a plurality of hydrogen-absorbing alloys $M_1, M_2, \ldots, M_X$, each having a preferred orientation in lattice plane $(h_0k_0l_0)$ and having the same alloy composition as the hydrogen-absorbing alloy E, and measuring integrated intensities of X-ray diffraction peaks $I_s(h_1k_1l_1)$, $I_s(h_2k_2l_2)$ ..., $I_s(h_xk_xl_x)$ in lattice planes $(h_1k_1l_1)$, $(h_2k_2l_2)$, ... $(h_xk_xl_x)$, respectively, for a hydrogen-absorbing alloy S having the same alloy composition as the hydrogen-absorbing alloy E, determining integrated intensity ratios $I_{M1}(h_1k_1l_1)/I_S(h_1k_1l_1)$, $I_{M2}(h_2k_2l_2)/I_S(h_2k_2l_2)$, ..., $I_{MX}(h_xk_xl_x)/I_S(h_xk_xl_x)$ and angles $\phi_1, \phi_2, \ldots, \phi_X$ formed by the lattice plane $(h_1k_1l_1)$, $(h_2k_2l_2)$, ..., $(h_Xk_Xl_X)$ and the lattice plane $(h_0k_0l_0)$, respectively, and determining parameters $P_A$ and $P_B$, which vary according to a structure of the plurality of hydrogen absorbing alloys $M_1, M_2, \ldots, M_x$ and are parameters of a function $F(\phi)$, where:

$$F(\phi)=P_A+(1-P_A)\exp(-P_B\cdot\phi^2)=I(hkl)/I_S(hkl) \quad (B)$$

wherein $I(hkl)$ is an integrated intensity of the X-ray diffraction peak in lattice plane (hkl) of the plurality of hydrogen-absorbing alloys $M_1, M_2, \ldots, M_X$; $I_S(hkl)$ is an integrated intensity of the X-ray diffraction peak in lattice plane (hkl) of the hydrogen-absorbing alloy S; and $\phi$ is an angle formed by the lattice plane $(h_0k_0l_0)$ and the lattice plane (hkl);

(2) determining a relationship between the parameters $P_A$ and/or $P_B$ and observed values, $T_1, T_2, \ldots, T_X$ representing at least one property of the plurality of hydrogen-absorbing alloys $M_1, M_2, \ldots, M_X$ as an electrode material;

(3) measuring integrated intensities of X-ray diffraction peaks $I_{E1}(h_{E1}k_{E1}l_{E1})$, $I_{E2}(h_{E2}k_{E2}l_{E2})$, ..., $I_{EY}(h_{EY}k_{EY}l_{EY})$ in selected lattice planes $(h_{E1}k_{E1}l_{E1})$, $(h_{E2}k_{E2}l_{E2})$, ..., $(h_{EY}k_{EY}l_{EY})$, respectively, for the hydrogen-absorbing alloy E, determining integrated intensity ratios $I_{E1}(h_{E1}k_{E1}l_{E1})/I_S(h_{E1}k_{E1}l_{E1})$, $I_{E2}(h_{E2}k_{E2}l_{E2})/I_S(h_{E2}k_{E2}l_{E2})$, ..., $I_{EY}(h_{EY}k_{EY}l_{EY})/I_S(h_{EY}k_{EY}l_{EY})$ and angles $\phi_{E1}, \phi_{E2}, \ldots, \phi_{EY}$ formed by the lattice planes $(h_{E1}k_{E1}l_{E1})$, $(h_{E2}k_{E2}l_{E3})$, ..., $(h_{EY}k_{EY}l_{EY})$ and the lattice plane $(h_0k_0l_0)$, respectively, and determining parameters $P_{EA}$ and/or $P_{EB}$ for the hydrogen-absorbing alloy E, by substituting the determined integrated intensity ratios and angles for $I(hkl)/I_S(hkl)$ and $\phi$ in formula (B); and (4) comparing the parameters $P_{EA}$ and/or $P_{EB}$ with the relationship between the parameters $P_A$ and/or $P_B$ and the observed values $T_1, T_2, \ldots, T_x$ in step (2) to estimate at least one property of the hydrogen-absorbing alloy E as an electrode material;

wherein the at least one property of the hydrogen-absorbing alloy E estimated in said step (4) is one of corrosion resistance, initial electrode capacity, retention of capacity, and a degree of activation.

* * * * *